(12) United States Patent
Tsukamoto et al.

(10) Patent No.: US 10,326,496 B2
(45) Date of Patent: Jun. 18, 2019

(54) DIGITAL WIRELESS COMMUNICATION DEVICE AND DIGITAL WIRELESS COMMUNICATION SYSTEM

(71) Applicants: ADVANCED TELECOMMUNICATIONS RESEARCH INSTITUTE INTERNATIONAL, Soraku-gun, Kyoto (JP); FUJIKURA LTD., Tokyo (JP)

(72) Inventors: Satoshi Tsukamoto, Soraku-gun (JP); Takahiro Maeda, Soraku-gun (JP); Yafei Hou, Soraku-gun (JP); Masayuki Ariyoshi, Soraku-gun (JP); Kiyoshi Kobayashi, Soraku-gun (JP); Fumio Suzuki, Sakura (JP); Atsuhiko Niwa, Sakura (JP)

(73) Assignees: Advanced Telecommunications Research Institute International, Soraku-gun, Kyoto (JP); Fujikura Ltd., Tokyo (JP)

( * ) Notice: Subject to any disclaimer, the term of this patent is extended or adjusted under 35 U.S.C. 154(b) by 254 days.

(21) Appl. No.: 15/125,999

(22) PCT Filed: Sep. 3, 2015

(86) PCT No.: PCT/JP2015/075087
§ 371 (c)(1),
(2) Date: Sep. 14, 2016

(87) PCT Pub. No.: WO2016/035857
PCT Pub. Date: Mar. 10, 2016

(65) Prior Publication Data
US 2018/0145728 A1 May 24, 2018

(30) Foreign Application Priority Data

Sep. 4, 2014 (JP) .................. 2014-180668
Jan. 14, 2015 (JP) .................. 2015-005292

(51) Int. Cl.
*H04B 5/00* (2006.01)
*H01Q 13/22* (2006.01)
(Continued)

(52) U.S. Cl.
CPC ......... *H04B 5/0018* (2013.01); *H01Q 13/203* (2013.01); *H01Q 13/22* (2013.01);
(Continued)

(58) Field of Classification Search
CPC combination set(s) only.
See application file for complete search history.

(56) References Cited

U.S. PATENT DOCUMENTS

2009/0298421 A1    12/2009   Andersson et al.
2011/0234338 A1*   9/2011    Takahashi ............ H01Q 13/203
                                                      333/237
(Continued)

FOREIGN PATENT DOCUMENTS

EP        2495882 A1      9/2012
JP        2008-545329 A   12/2008
(Continued)

OTHER PUBLICATIONS

Nishikawa, K.I., Higashino, T., Tsukamoto, K. and Komaki, S., Sep. 2009. Two dimensional position detection method using bi-directional leaky coaxial cable based on TDOA. In Personal, Indoor and Mobile Radio Communications, 2009 IEEE 20th International Symposium on (pp. 2167-2170). IEEE. Vancouver.*

(Continued)

*Primary Examiner* — Zhitong Chen
(74) *Attorney, Agent, or Firm* — Birch, Stewart, Kolasch & Birch, LLP

(57) ABSTRACT

A composite cable (4) houses a plurality of leaky coaxial cables having mutually different radiation characteristics. The leaky coaxial cable (2a, 2b) includes therein an inner (Continued)

conductor and an outer conductor, and has a plurality of leakage slots. The plurality of leakage slots have different slot periods relative to the axial direction or arranged in different slot patterns. The digital wireless communication device feeds a high-frequency signal from an end of the composite cable (4) and performs MIMO (multiple-input multiple-output) communication.

14 Claims, 30 Drawing Sheets

(51) Int. Cl.
    *H04B 7/04*     (2017.01)
    *H04B 1/04*     (2006.01)
    *H01Q 13/20*     (2006.01)
    *H01Q 25/00*     (2006.01)
    *H04B 7/0413*     (2017.01)
    *H01Q 21/28*     (2006.01)
    *H04B 7/10*     (2017.01)

(52) U.S. Cl.
    CPC ......... *H01Q 25/004* (2013.01); *H04B 1/0483* (2013.01); *H04B 7/04* (2013.01); *H04B 7/0413* (2013.01); *H01Q 21/28* (2013.01); *H04B 7/10* (2013.01)

(56) References Cited

U.S. PATENT DOCUMENTS

2012/0306711 A1* 12/2012 Asplund .............. H01Q 13/203
                                                                                        343/776
2013/0257669 A1   10/2013  Asplund et al.

FOREIGN PATENT DOCUMENTS

JP     2011-199760 A     10/2011
JP     2013-90044 A     5/2013
JP     2013090044 A   *  5/2013   ............. H04J 99/00

OTHER PUBLICATIONS

H. Kawai et al. "Study on Throughput Performance of MIMO Transmission in Passenger Trains Using Leaky Coaxial Cables", IEICE technical report. Antennas and propagation 111(376), Jan. 11, 2012, pp. 147-152.

J. Medbo et al. "Leaky Coaxial Cable MIMO Performance in an Indoor Office Environment", In 2012 IEEE 23rd International Symposium on Personal, Indoor and Mobile Radio Communications (PIMRC), Sep. 9, 2012, pp. 2016-2066.

S. Tsukamoto et al. "A Feasible Study of 2×2 MIMO System with Single Leaky Coaxial Cable", In Proceedings of the IEICE General Conference, 2013.

S. Tsukamoto et al. "Performance Evaluation of 2×2 MIMO System with Single Leaky Coaxial Cable", In Proceedings of VJISAP(Vietnam—Japan International Symposium on Antennas and Propagation), Jan. 2014, pp. 261-264.

Y. Hou et al. "2 by 2 MIMO System Using Single Leaky Coaxial Cable for Linear-cells", In 2014 IEEE 25th Annual International Symposium on Personal, Indoor, and Mobile Radio Communication (PIMRC), Sep. 2, 2014, pp. 327-331.

Y. Hou et al. "4-by-4 MIMO Channel Using Two Leaky Coaxial Cables (LCXs) for Wireless Applications Over Linear-cell", In 2014 IEEE 3rd Global Conference on Consumer Electronics (GCCE), Oct. 7, 2014, pp. 125-126.

Y. Hou et al. "Realization of 4-by-4 MIMO Channel Using One Composite Leaky Coaxial Cables", In 2015 12th Annual IEEE Consumer Communications and Networking Conference (CCNC), Jan. 9, 2015, pp. 97-102.

Higashino et al., "A wireless sensing technique based on channel estimation in leaky coaxial cable antenna system," 2014 XXXIth URSI General Assembly and Scientific Symposium (URSI GASS), IEEE, Aug. 16, 2014, 4 pages.

* cited by examiner

DIGITAL WIRELESS COMMUNICATION DEVICE AND DIGITAL WIRELESS COMMUNICATION SYSTEM

TECHNICAL FIELD

The present invention relates to a configuration of a wireless communication technique for digital communication between a mobile station and a ground station provided on the ground.

BACKGROUND ART

Mobile communication terminals such as smart phones are currently necessities of life, and communication traffic using these terminals has been increasing in buses, trains and air planes.

On the other hand, a leaky coaxial cable (LCX) has been used as an antenna as a measure for communication in a dead zone such as tunnels and underground malls because of its advantages in connection stability. Further, since it is possible to provide communication range along the cable, its deployment to "linear cells" is also expected.

Specifically, stable wireless network connection would be necessary at positions of arrangement over some long and narrow places referred to as the "linear cell" such as an area along a railway, tunnels, underground malls, shopping malls, planes or trains. In a linear cell environment as such, leaky coaxial cable can be used as an antenna for wireless communication because it has many potential advantages. Namely, when a leaky coaxial cable is used in a linear cell, its coverage is uniform and its installation might be simpler than other methods.

On the other hand, in order to improve frequency usage efficiency, application of MIMO (Multiple-Input Multiple-Output) technique to a system using LCX has also been studied (see Non-Patent Literature 1 listed below).

According to the method disclosed in Non-Patent Literature 1, however, a plurality of LCXs must be arranged apart from each other so as to ensure sufficiently low correlation between each other, which leads to the problem of increased cost of installation and maintenance.

As a solution to such a problem, 2×2 MIMO system using a single LCX has been proposed (see Non-Patent Literatures 2 and 3 as listed below). According to this method, it is necessary to input signals from opposite sides of LCX and, therefore, it is necessary to arrange the LCX such that its opposite ends are placed at substantially the same position, or to arrange a separate coaxial cable to the opposite end of LCX. Therefore, cost of installation increases if the LCX becomes long.

Patent Literature 1 listed below discloses a configuration of bundled leaky coaxial cables realizing MIMO communication, in which external conductors of first, second and third leaky coaxial cables respectively have slits of prescribed size formed with prescribed spacing, wherein the first to third leaky coaxial cables are bundled such that the slit angles on the outer circumference are orientated in prescribed directions different cable to cable, or such that the spacing between leaky coaxial cables is at least one half the wavelength, or such that planes of polarization are in different directions cable to cable, so as to reduce the correlation.

CITATION LIST

Patent Literature

PTL 1: JP2011-199760 A

Non Patent Literature

NPL 1: KAWAI et al., "Study on Throughput Performance of MIMO Transmission in Passenger Trains Using Leaky Coaxial Cables" IEICE Technical Report, AP2011-172 (2012 January), pp. 147-152.

NPL 2: TSUKAMOTO et al., "A Feasible Study of 2×2 MIMO System with Single Leaky Coaxial Cable" Proceedings of the 2013 IEICE General Conference, B-1-200.

NFL 3: S. Tsukamoto, T. Maeda and Y. Hou, et al. "Performance evaluation of 2×2 MIMO system with single leaky coaxial cable," in Proc. VJISAP (Vietnam-Japan International Symposium on Antennas and Propagation) 2014, pp. 261-264, January 2014.

SUMMARY OF INVENTION

Technical Problem

For a system accommodating heavier communication traffic, however, it is necessary to further improve spectrum efficiency.

Further, it is also necessary not to increase cost of installation when such improvement of spectrum efficiency is to be realized by leaky coaxial cables.

Though Patent Literature 1 discloses the technique as summarized above, it fails to fully examine a configuration actually realizing satisfactory MIMO characteristics when a plurality of leaky coaxial cables are arranged close to each other.

The present invention was made to solve the above-described problems, and its object is to provide digital wireless communication device and digital wireless communication system that can accommodate heavier communication traffic in a linear cell using leaky coaxial cables.

Another object of the present invention is to provide digital wireless communication device and digital wireless communication system that can accommodate heavier communication traffic with controllable cost of installing the leaky coaxial cables.

Solution to Problem

According to an aspect, the present invention provides a digital wireless communication device, including: a composite cable housing a plurality of leaky coaxial cables having radiation characteristics different from each other; wherein each of the leaky coaxial cables includes an inner conductor and an outer conductor and is provided with a plurality of leakage slots; the plurality of leaky coaxial cables have radiation angles different from each other, the radiation angle being an angle between peak radiation direction and normal direction of the axial direction of the leaky coaxial cable in a plane including the axial direction and the normal direction; and the digital wireless communication device further includes transmitting means for feeding a high-frequency signal from at least one end of the composite cable and thereby for executing MIMO (multiple-input multiple-output) communication.

Preferably, the plurality of leaky coaxial cables have the leakage slots arranged at periods different cable by cable so as to have different radiation angles.

Preferably, electric permittivity of an insulator between the inner conductor and outer conductor, or a diameter of the inner conductor of each of the plurality of leaky coaxial cables is different from other leaky coaxial cables so as to have different radiation angles.

Preferably, difference of the different radiation angles is at least 11 degrees.

Preferably, among the plurality of leaky coaxial cables, angles of the leakage slots relative to the axial direction of the leaky coaxial cables are different cable by cable.

Preferably, the transmitting means feeds a high-frequency signal to each of the leaky coaxial cables from opposite ends of the composite cable.

Preferably, the plurality of leaky coaxial cables are housed in a single covering structure.

According to another aspect, the present invention provides a digital wireless communication system, including: a fixedly-installed first digital wireless communication device; wherein the first digital wireless communication device includes a composite cable housing a plurality of leaky coaxial cables having radiation characteristics different from each other; each of the leaky coaxial cables includes an inner conductor and an outer conductor and is provided with a plurality of leakage slots; the plurality of leaky coaxial cables have radiation angles different from each other, the radiation angle being an angle between peak radiation direction and normal direction of the axial direction of the leaky coaxial cable in a plane including the axial direction and the normal direction; the first digital wireless communication device further includes transmitting means for feeding a high-frequency signal from at least one end of the composite cable and thereby for executing MIMO (multiple-input multiple-output) communication; and the system further includes a mobile terminal as a second digital wireless communication device performing the MIMO communication with the first digital wireless communication device.

Preferably, the plurality of leaky coaxial cables have the leakage slots arranged at periods different cable by cable so as to have the different radiation angles.

Preferably, the plurality of leaky coaxial cables have electric permittivity of an insulator between the inner conductor and outer conductor made different or diameter of the inner conductor made different cable by cable so as to have the different radiation angles.

Preferably, difference of the different radiation angles is at least 11 degrees.

Preferably, among the plurality of leaky coaxial cables, angles of the leakage slots relative to the axial direction of the leaky coaxial cables are different cable by cable.

Preferably, the transmitting means feeds a high-frequency signal to each of the leaky coaxial cables from opposite ends of the composite cable.

Preferably, the plurality of leaky coaxial cables are housed in a single covering structure.

Advantageous Effects of Invention

According to the digital wireless communication device and the digital wireless communication system of the present invention, heavier communication traffic can be held in a linear cell using leaky coaxial cables.

Further, according to the digital wireless communication device and the digital wireless communication system of the present invention, heavier communication traffic can be held without increasing the cost of installing the leaky coaxial cables.

DESCRIPTION OF EMBODIMENTS

Figure 1:
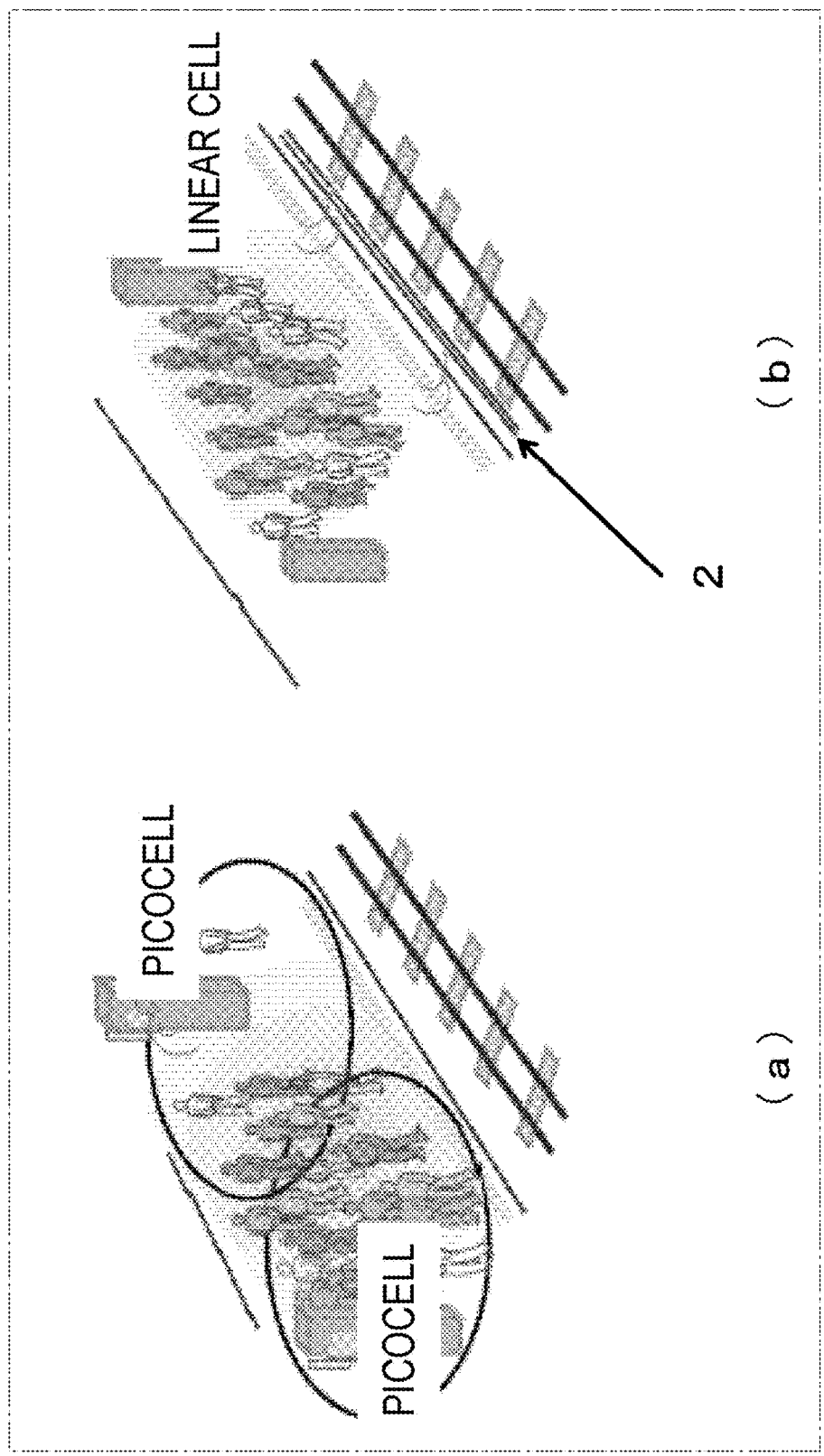
FIG. 1 includes illustrations showing the concept of linear cell in accordance with an embodiment.

In the following, the wireless communication system in accordance with embodiments of the present invention will be described with reference to the figures. In the embodiments below, components and process steps denoted by the same reference characters represent the same or corresponding components or steps and, therefore, description thereof will not be repeated unless necessary.

Embodiment 1

(Outline of Wireless Communication System)

FIG. 1 includes illustrations showing the concept of linear cell in accordance with an embodiment.

When wireless communication is to be realized in an environment such as a railway platform as shown in (a) of FIG. 1, for example, conventionally, one wireless base station is provided per one picocell, and when a user having a terminal moves on the platform from one picocell to another, a handover process is necessary.

On the other hand, when a leaky coaxial cable 2 is used as an antenna as shown in (b) of FIG. 1, handover process and interference between cells can be avoided.

Further, as will be described later, in order to improve frequency use efficiency of an LCX system in an environment in which density of mobile terminals is so high as to cause communication traffic congestion, the system of FIG. 1(b) improves communication capacity of wireless communication using MIMO technique.

Figure 2:
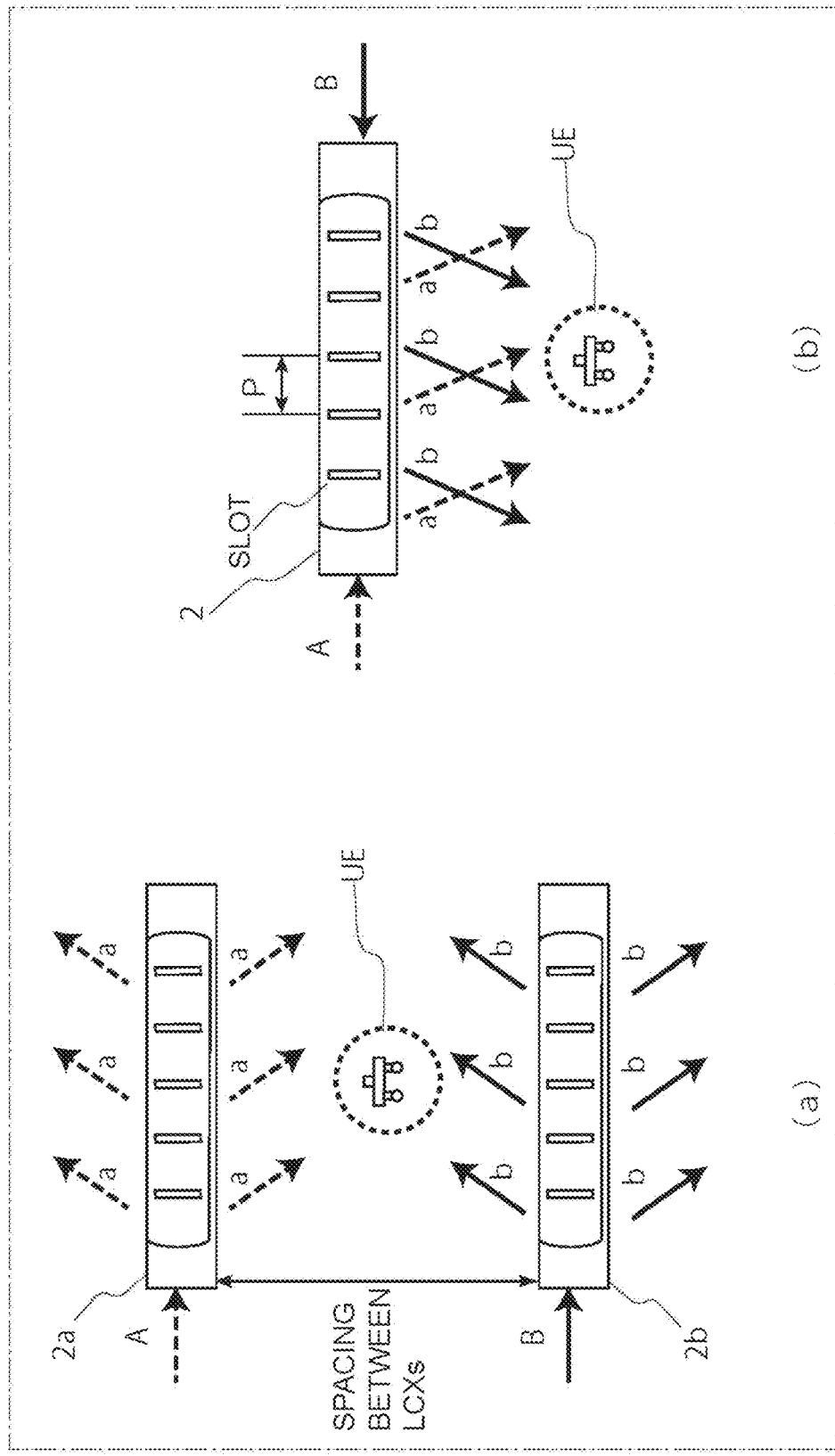
FIG. 2 includes illustrations showing a conventional MIMO method using LCXs.

FIG. 2 includes illustrations showing a conventional MIMO method using LCXs.

As shown in FIG. 2(a), conventionally, the MIMO system is configured based on an idea that one LCX simply serves as one antenna.

Radiation characteristic is highly correlated if input RF signal directions A and B are identical.

Therefore, in order to form the MIMO system, a plurality of (two in the figure) LCXs 2a and 2b are necessary and, the LCXs must be separated from each other with a prescribed spacing. Thus, signals A and B are supplied from one end of respective LCXs spaced from each other and, with a terminal UE positioned between the LCXs, MIMO communication is realized.

On the other hand, as described in Non-Patent Literature 2 mentioned above, by supplying signals A and B from opposite ends of a single LCX, input RF signal propagations have different directions, and antenna directivity patterns come to be different and to have low correlation. Therefore, by using a single LCX as two antennas (as an antenna having two directivities), 2×2 MIMO system can be realized.

Figure 3:
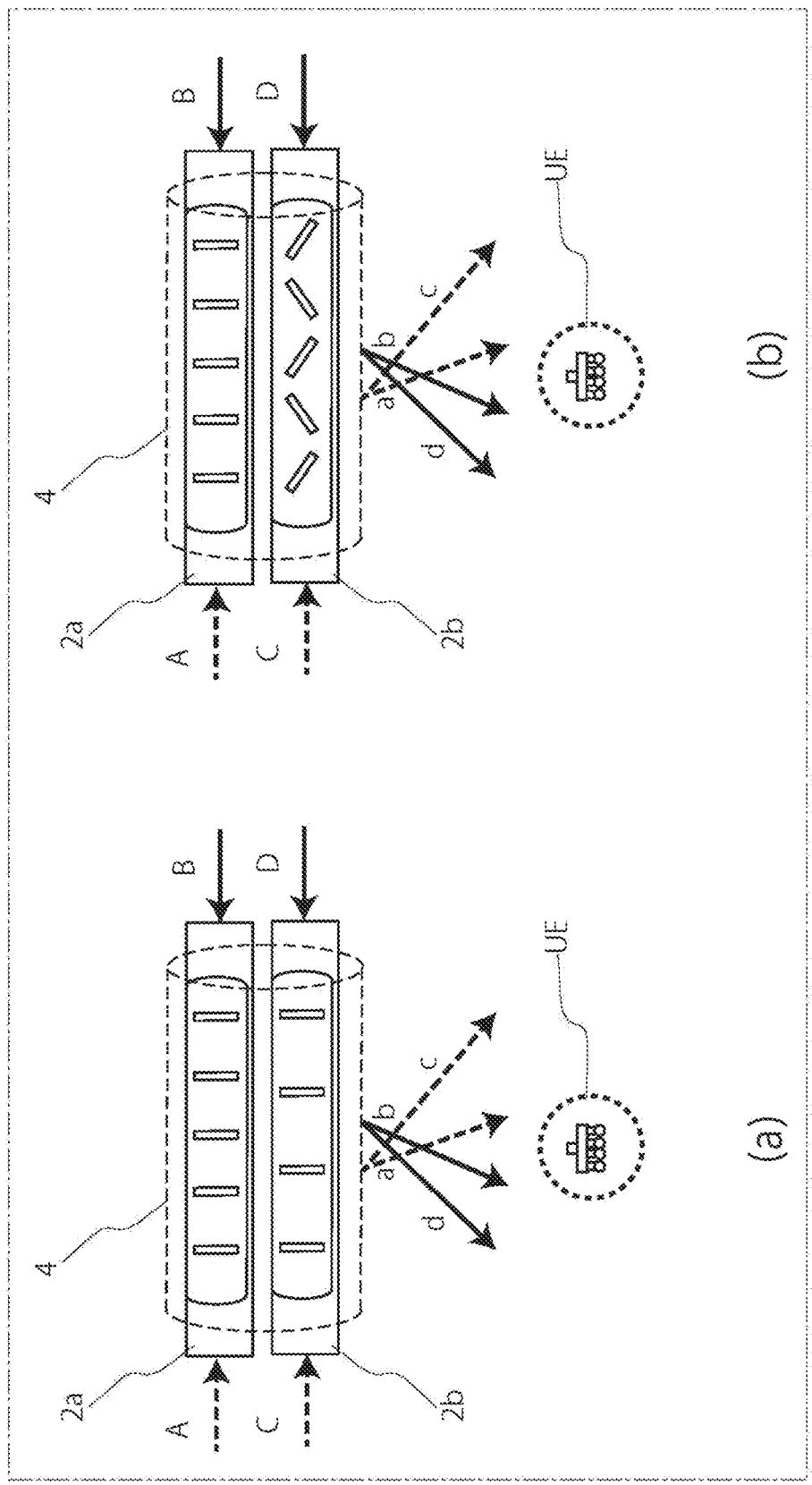
FIG. 3 includes illustrations showing MIMO communication by a composite LCX cable in accordance with an embodiment.

Two illustrations of FIG. 3 show MIMO communication by a composite LCX cable in accordance with the present embodiment.

By combining two LCXs 2a and 2b having different radiation characteristics in one composite cable 4, this further realizes 4×4 MIMO system. Specifically, composite cable 4 contains two LCXs 2a and 2b having different radiation characteristics in one covering structure, and RF signals A and C are supplied from one end and RF signals B and D are supplied from the other end, to LCXs 2a and 2b.

In the example shown in FIG. 3(a), radiation characteristics are made different by making different the spacing P (see FIG. 2) between slots, from which wave leaks, of LCXs. Alternatively, as shown in FIG. 3(b), by changing the inclination angle of slots with respect to the axis of leaky coaxial cable while maintaining the open area of the slots constant, it is possible to change the radiation characteristics such as radiation intensity and wave polarization. In addition, in order that different LCXs have different radiation characteristics, the spacing between slots as well as the inclination angle of slots with respect to the axis of leaky coaxial cable may be changed. The number of LCXs having mutually different radiation characteristics housed in one covering structure is not limited to and may be larger than two.

Figure 4:
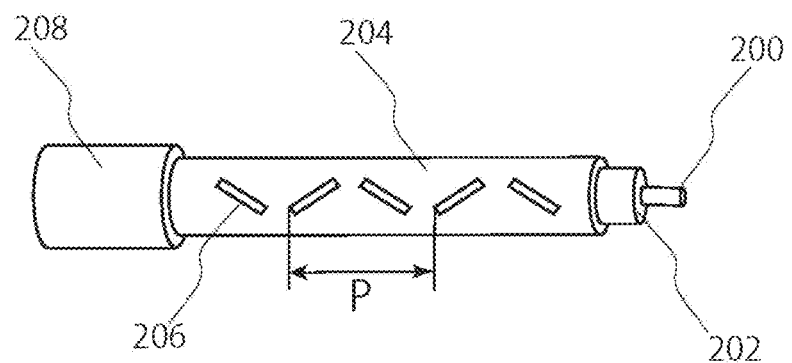
FIG. 4 is an illustration of an LCX structure for differentiating radiation characteristics.

FIG. 4 is an illustration of an LCX structure for differentiating radiation characteristics. FIG. 4 shows an LCX with outer elements removed one by one to show the inner elements.

Around an inner conductor 200 on the central axis of LCX, an insulator layer 202 having relative permittivity $\varepsilon_r$ is provided. Around the outer circumference of insulator layer 202, an outer conductor 204 is provided, in which slots 206 are formed with a spacing P. On the outer circumference of outer conductor 204, a covering structure 208 is provided.

In the structure shown in FIG. 4, the radiation angle $\theta_m$ with peak directivity relative to the direction normal to the axial direction of LCX is given by the equation below.

$$\theta_m = \sin^{-1}\left(\sqrt{\varepsilon_r} + \frac{m\lambda_{RF}}{P}\right), (m = -1, -2, \dots)$$

Here, m is a parameter representing an order of harmonics, of which absolute value represents the order, $\lambda_{RF}$ represents wavelength of RF wave, and P represents spacing between slots. LCX is typically designed so that value m=−1, to reduce radiation of harmonics and to form a stable propagation path.

Figure 5:
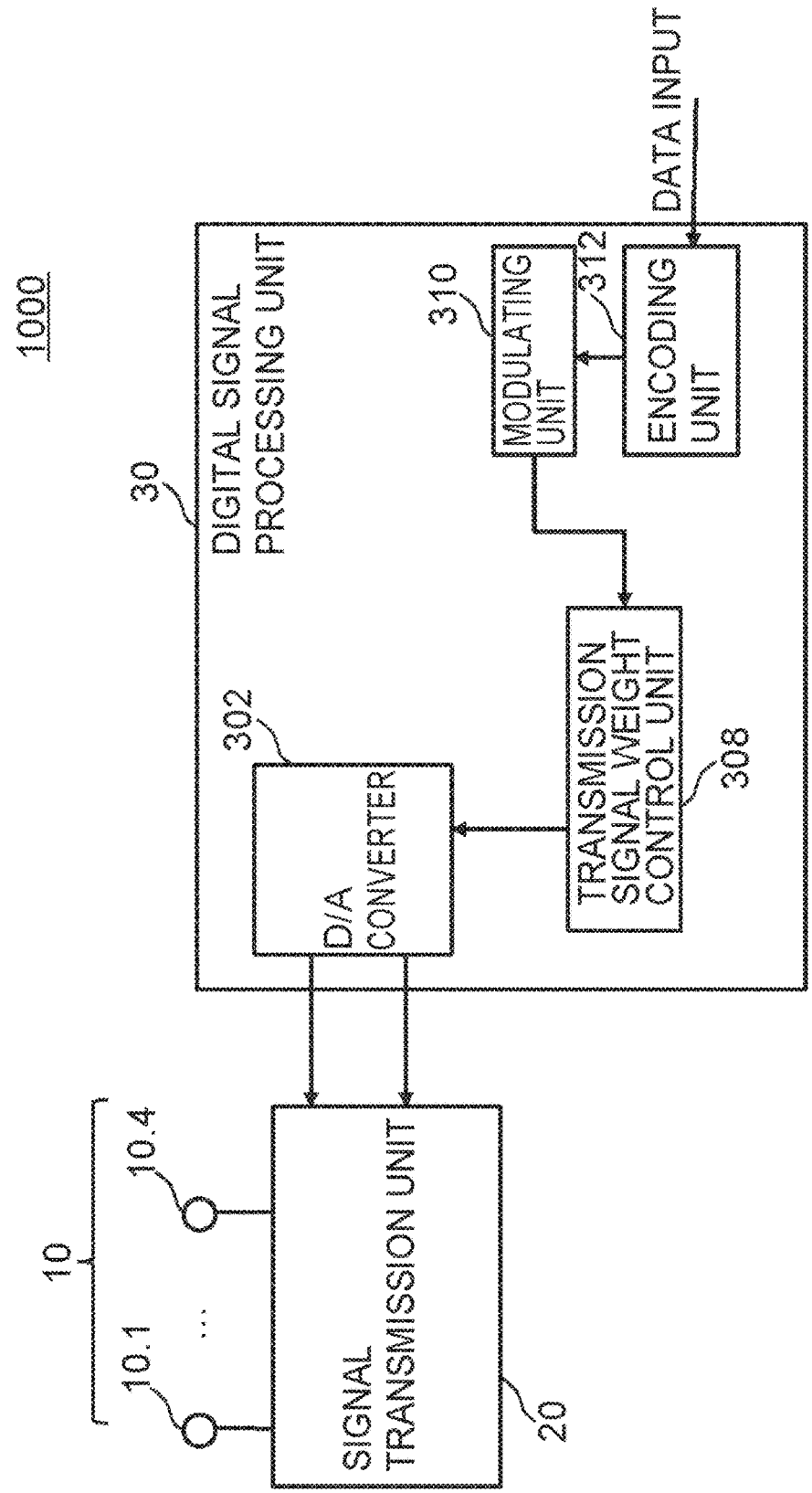
FIG. 5 is a functional block diagram of a digital wireless communication device 1000 supplying RF signals to a composite cable 4.

FIG. 5 is a functional block diagram of a digital wireless communication device 1000 supplying RF signals to a composite cable 4 (see FIG. 3). It is assumed that digital wireless communication device 1000 is installed in a ground station (for example, a base station) and generates signals to be radiated from the composite cable. As to the receiving structure, basically, any structure may be used provided that it has a configuration for executing the process opposite to the transmitting side configuration.

Referring to FIG. 5, digital wireless communication device 1000 is provided with nodes 10.1 to 10.n for transmitting signals to composite cable 4. Though not limiting, here it is assumed that the number of nodes 10.1 to 10.n is four, and that nodes 10.1 to 10.4 transmit signals A to D shown in FIG. 3, respectively. It is noted that signals A to D must be transmitted from opposite sides of composite cable 4, as shown in FIG. 3, to have this configuration operate as 4×4 MIMO. If it is assumed to operate as 2×2 MIMO, however, the configuration may be adapted such that signals A and C (or signals B and D) are transmitted from one end of composite cable 4, and the other end may be provided with a terminator. In the following description, it is assumed that the configuration operates as 4×4 MIMO.

Digital wireless communication device 1000 is further provided with: an encoding unit 312 encoding data to be transferred, and further conducting error-correction coding; a modulating unit 310 for modulating signals from encoding unit 312; a transmission signal weight control unit 308 for transmission-weighting a signal from modulating unit 310; a D/A converter unit 302 for D/A converting the transmission-weighted signal; and a signal transmission unit 20 up-converting and amplifying the analog-converted signal and supplying it to each of the nodes 10.1 to 10.4. The operations of transmission signal weight control unit 308 and the like are common as a signal processing of MIMO and, therefore, description thereof will not be given here.

As shown in FIGS. 3 and 4, by adjusting the direction and period (spacing) P of slots, each of LCXs housed in one composite cable 4 comes to have different radiation characteristics and, hence, 4×4 MIMO can be realized.

In this manner, different radiation characteristics come to generate different propagation paths and thus, efficient 4×4 MIMO channels can be realized.

(Measurements Configuration for 4×4 LCX MIMO System)

In the following, results of experimental characteristic evaluations of the MIMO system in accordance with the embodiment above will be described.

For the measurement system provided in an anechoic chamber, composite cable 4 is laid on the edge of foaming polystyrene, which is placed on a radio wave absorber.

Two types of LCXs (hereinafter referred to as V-type LCX and M-type LCX) are combined as one composite cable.

Figure 6:
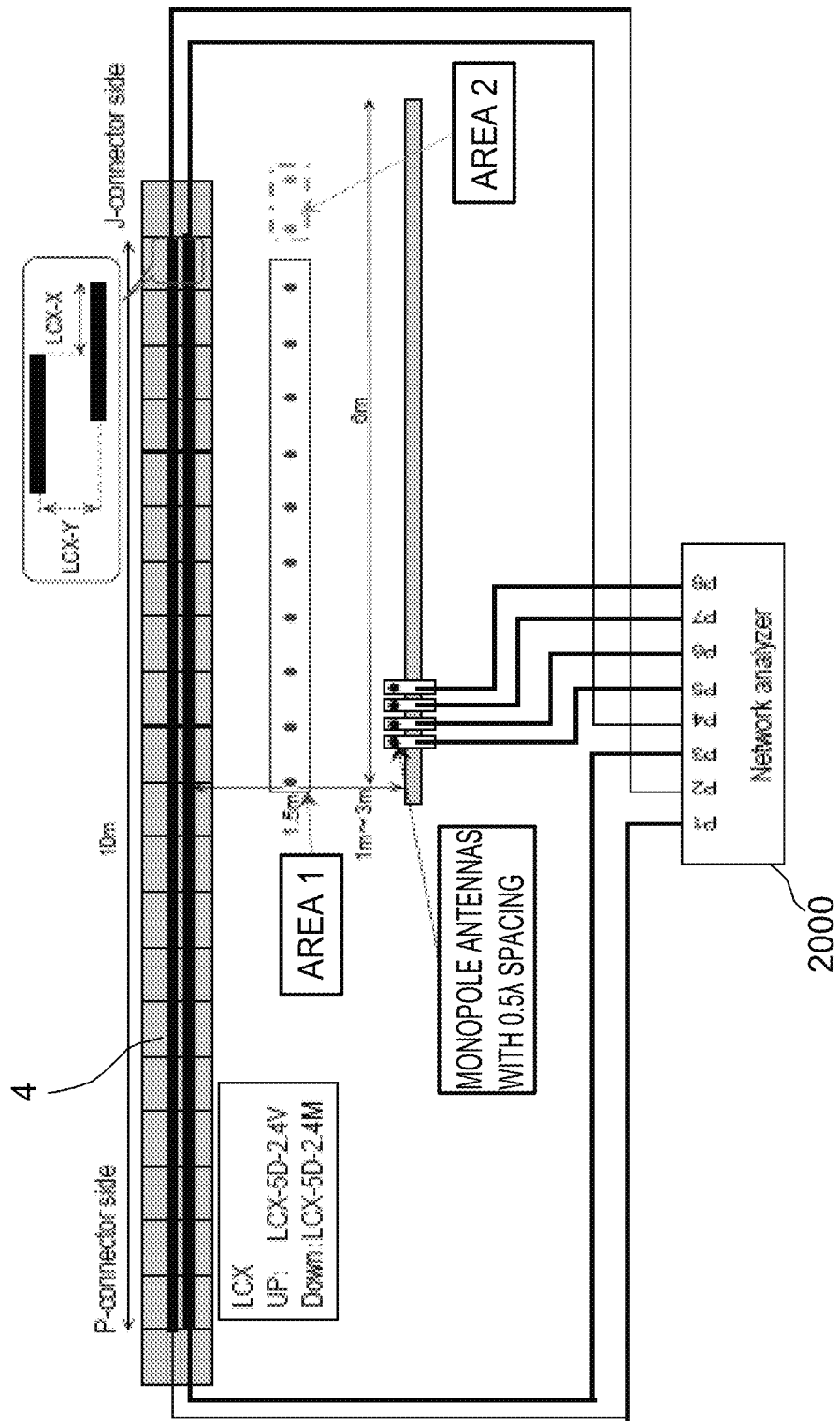
FIG. 6 is an illustration of a measurement system.

FIG. 6 is an illustration of a measurement system. As shown in FIG. 6, in this measurement system, the propagation channel matrices between composite cable and four receiving antennas (monopole antennas arranged at a spacing of ½ wavelength) consist of 4×4 channel elements. Characteristics of the propagation channel matrices are measured by a multi-ports vector network analyzer 2000 such as shown in FIG. 6. In FIG. 6, we use "LCX-Y" to represent the spacing between the two LCXs.

Since there is no reflection path and channel propagation is static in an anechoic chamber, a shape of a cell that is formed by the LCX is assumed to be symmetric with respect to the Y axis at a position of 5 m, that is, one half the entire length of LCX.

FIG. 6 also depicts measurement points within the area. Twelve positions including two positions outside the end of the LCX are selected as measurement points. These positions are divided into two areas marked as Area 1 and Area 2. Area 1 represents the positions that the terminals UE (user terminals) are within the LCX. Area 2 represents the positions that terminals UE are out of the edge of the LCX.

The measurement is carried out with central frequency of 2.452 GHz, with the setting of sampling 401 frequency points within the bandwidth of 125 MHz.

(Channel Characteristics of 4×4 LCX MIMO)

To confirm that the LCX-MIMO can realize 4×4 channels, we use condition number (CN) γ as a metric of MIMO system. As described in Non-Patent Literature 2, the index of condition number is known to allow simple evaluation as to whether the 4×4 MIMO successfully realizes four-times multiplexing.

An MIMO propagation channel with a lower condition number is a better channel. An MIMO propagation channel with a high condition number requires high S/N ratio (signal to noise ratio) in separating signal streams, in order to attain higher degree of separation between signal streams, resulting in lower transmission characteristics. Specifically, the "condition number" is calculated from the ratio between the maximum and minimum singular values of MIMO channel matrix. If a small estimation error of the propagation channel matrix coefficient causes only a small error in decoding signals from MIMO transmission path, it is said to be a "well-conditioned system." If a small error of coefficient may possibly have significant influence on signal decoding, the system condition is bad. The condition number is an index of such system condition and it is typically a numerical value in dB.

More specifically, the measured 4×4 matrix H is decomposed using singular value decomposition as:

$$H = U\Sigma V^*$$

Here, U and V are unitary matrices. Further, matrix Σ is a real diagonal matrix with non-negative diagonal elements having singular values as diagonal elements. If the matrix H is a normal matrix, the singular values equal to absolute values of eigenvalues. Therefore, assuming that the eiganvalues are all non-negative real numbers, the following relation holds.

$$\Sigma = \text{diag}\{\lambda_1, \lambda_2, \lambda_3, \lambda_4\}$$

Here, $\lambda_i$ represents i-th eigenvalue of matrix H.

The condition number (CN) γ [dB] is computed as below, where $\lambda_{max}$ represents the largest and $\lambda_{min}$ represents the smallest of the four eigenvalues:

$$\gamma = 20 \times \log_{10}(\lambda_{max}/\lambda_{min})$$

A matrix with a low CN is said to be "well-conditioned" matrix. It means that the propagation channel has good condition for capacity increase of traffic. Therefore, the distribution of CN can show the channel characteristics.

Figure 7:
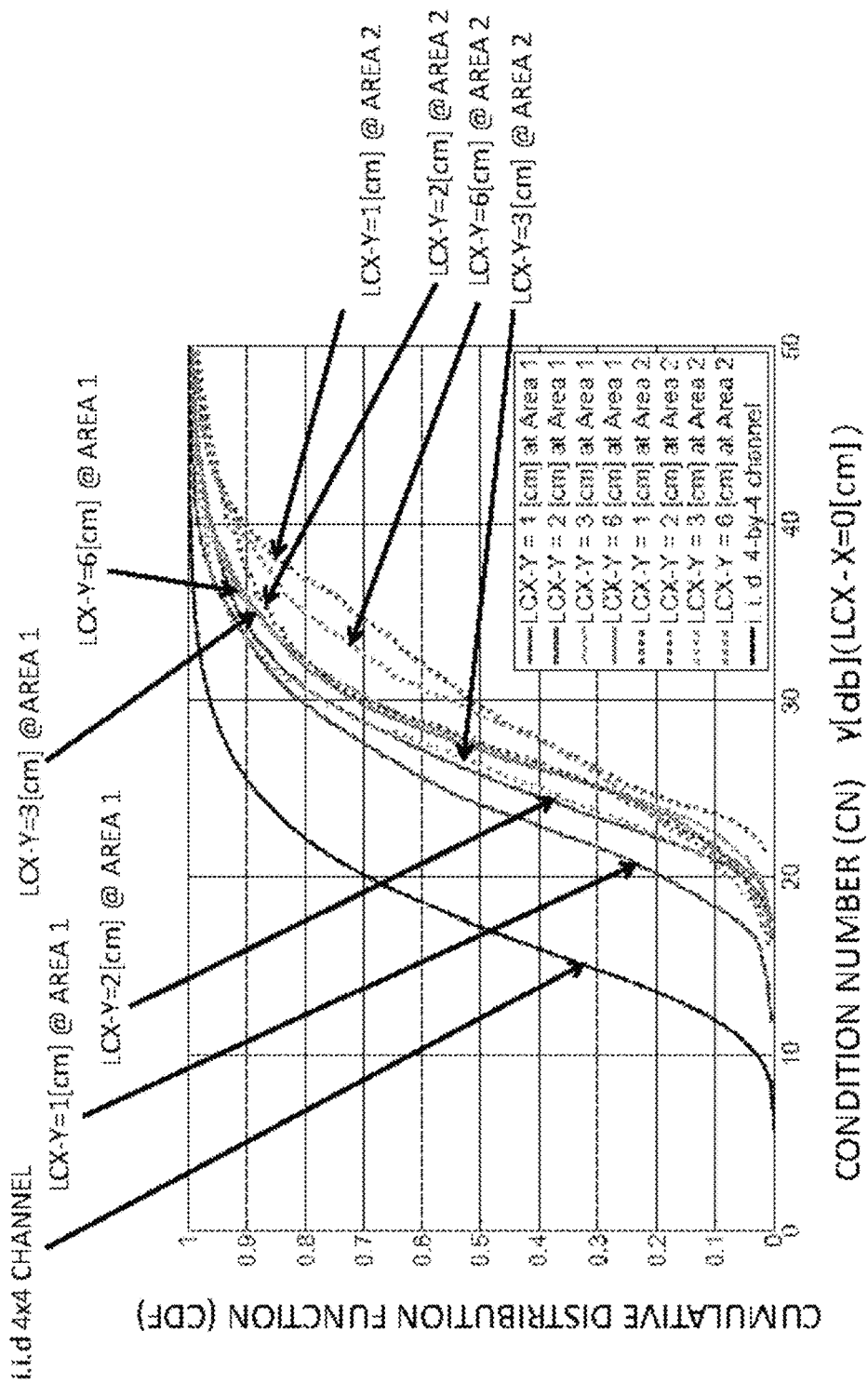
FIG. 7 shows Cumulative Distribution Function of CN values for each measured area.

FIG. 7 shows Cumulative Distribution Function (CDF) of CN values for each measured area. In FIG. 7, the value of "LCX-Y" is changed as 1 cm, 2 cm, 3 cm and 6 cm.

The small "LCX-Y" will reduce the thickness or width of the composite cable and benefit the cable design.

As shown in FIG. 7, LCX cables with "LCX-Y" as 1 cm, 2 cm, 3 cm and 6 cm in Area 1 as the assumed service area of linear cell show the better communication channel condition for MIMO transmission, and much better especially when "LCX-Y" is set to 1 cm.

The results show that the system in accordance with the present embodiment can reduce the space necessary for installing the system.

In addition, the measurement results show that generally a small "LCX-Y" can have a better condition for MIMO transmission in Area 1 than that of large "LCX-Y".

Further, in FIG. 7, to show the channel quality, we also provide, for comparison, the CDF of CN value for i. i. d. 4×4 MIMO channel (independent and identically distributed channel; a propagation channel of which statistical nature of propagation characteristics between transmission/reception antenna elements are identical, independent and not correlated).

Though the CN value of the proposed LCX-MIMO in an anechoic chamber where no reflection path exists is larger than that of the i. i. d. MIMO channel, it is still close to that of an outdoor environment.

Therefore, the CN value will be reduced and communication channel condition will be improved if the system using the LCXs configured as in the present embodiment is put on a real environment with more reflection paths.

As described above, according to the digital wireless communication device and the digital wireless communication system of the present embodiment, by realizing MIMO communication using leaky coaxial cables having different radiation characteristics in a linear cell, it becomes possible to accommodate heavier communication traffic.

In addition, according to the digital wireless communication device and the digital wireless communication system of the present embodiment, since a plurality of LCXs are collectively housed in one covering structure, it becomes possible to accommodate heavier communication traffic without increasing the cost of installing the leaky coaxial cables.

Embodiment 2

In Embodiment 2, a configuration for successfully realizing MIMO communication with the leaky coaxial cables structured by collectively housing a plurality of LCXs in one covering structure described in Embodiment 1 will be described in greater detail.

As already described with reference to FIG. 4, around inner conductor 200 on the central axis of LCX is provided insulator layer 202 having relative permittivity $\varepsilon_r$. Around the outer circumference of insulator layer 202 is provided outer conductor 204, in which slots 206 are formed with a spacing P. On the outer circumference of outer conductor 204, covering structure 208 is provided.

As the covering structure, a sheath of plastic resin, for example, may be used. On outer conductor 204, elongate holes referred to as slots are formed to be arranged periodically, through which electromagnetic signals are transmitted/received between the inside of LCXs and the outer environment.

(Radiation Principle and Radiation Angle)

Figure 8:
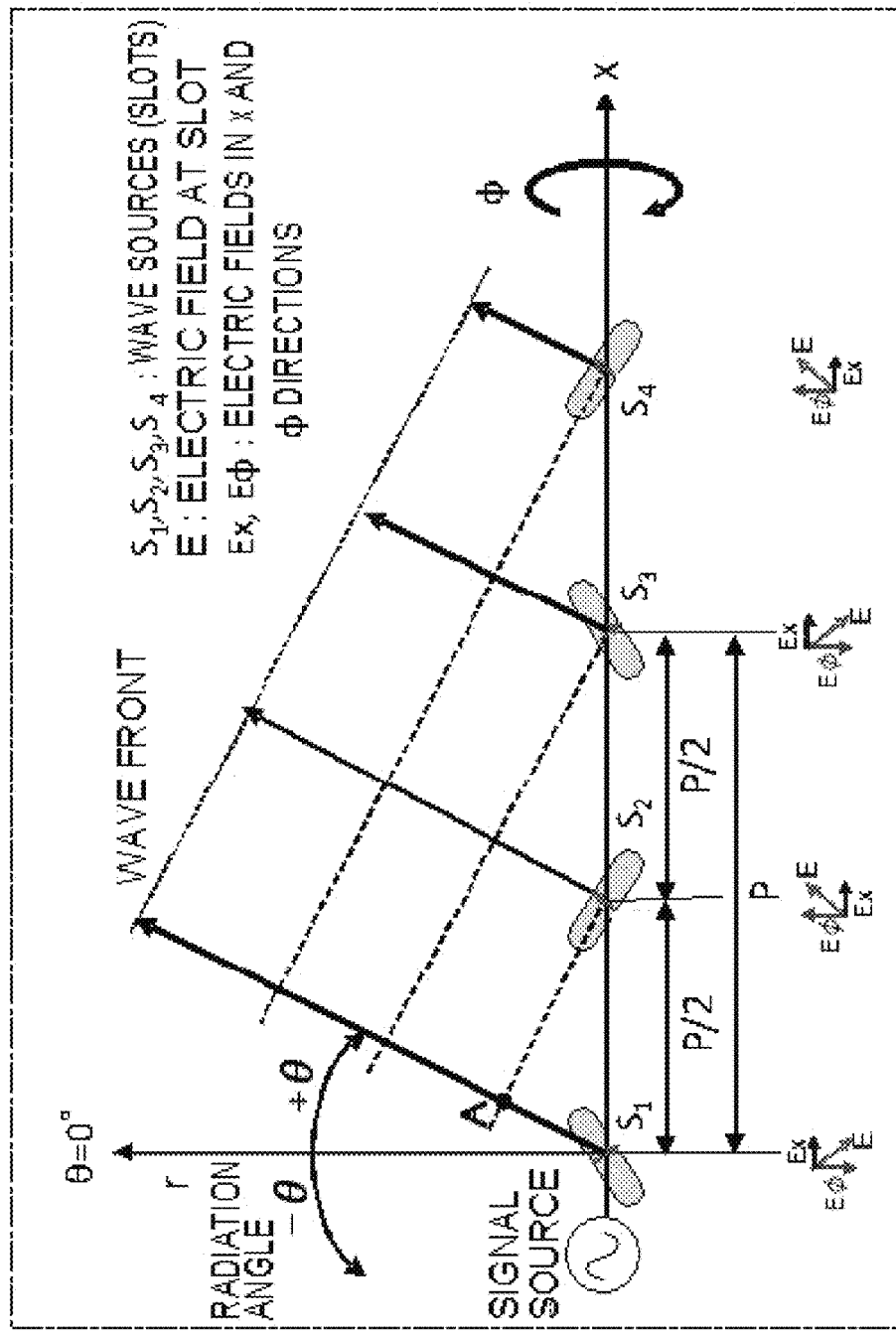
FIG. 8 is an illustration showing radiation principle and radiation angles from an LCX.

FIG. 8 is an illustration showing radiation principle and radiation angles from an LCX.

As shown in FIG. 8, the electromagnetic waves from an LCX are propagated as a combination of waves radiated from respective slots on the outer conductor as wave sources. In the coordinates of FIG. 8, X represents the length direction of LCX, $\phi$ represents the circumferential direction with the LCX being the axis, and r represents the normal direction from the LCX.

Slots $S_1$, $S_2$, $S_3$, . . . are positioned on the outer conductor, arranged with a constant spacing in the X direction. The spacing between slots of the same inclination is represented by a pitch P. At an intermediate position between these slots, there is a slot inclined in the opposite direction. This pattern of continuous slots with different inclinations is referred to as a "zigzag type", which is adopted in an LCX that radiates vertically polarized waves.

On the other hand, there is an LCX that radiates horizontally polarized waves, which adopts a "vertical type" pattern, in which non-inclined slots are arranged with a prescribed spacing. Here, "vertically polarized" means that when the LCX is placed horizontally, that is, parallel to the ground, the electric field becomes vertical to the ground, and "horizontally polarized" means the electric field becomes parallel to the ground.

The LCX has the same basic nature as a coaxial cable, and it transfers electromagnetic energy in TEM waves. In the cable, an electric field extends vertically from the surface of central conductor to the outer conductor, and a magnetic field rotates about the central conductor. An electric current flows in the X direction on the inner surface of outer conductor.

On the lower side of FIG. 8, electric fields generated at the slot portions by currents of very low frequencies as compared with the slot pitch are depicted. Assuming that an electric field E is generated at an inclined slot by the current in the X direction, the depicted images show that this can be decomposed to an electric field E$\phi$ in the $\phi$ direction and an electric field Ex in the X direction.

By way of example, here, assume that the slot pitch is set to be substantially the same as the wavelength in the cable of high-frequency signals. Then, at slot $S_2$, an instantaneous current flows in the direction opposite to that at slots $S_1$ and $S_3$. As a result, the electric field Ex at slot $S_2$ shown in the figure comes to have the direction opposite to electric fields of both sides and they will cancel each other.

In contrast, the electric fields E$\phi$ in the $\phi$ direction at these slots are of the same phase and hence, vertically polarized waves are radiated.

(Radiation Angle)

The radiation angle has been described with reference to FIG. 4, and the principle thereof will be described in greater detail in the following.

We represent the normal direction of LCX as 0 degree, the terminal end as +$\theta$ and the feeding end as −$\theta$. The combined electromagnetic wave from respective slots is radiated in the $\theta$ direction, and this $\theta$ is referred to as the radiation angle. Specifically, the radiation angle here represents an angle between the peak radiation direction and the direction normal to the axial direction of LCX in a plane including the axial direction and the normal direction.

Figure 30:
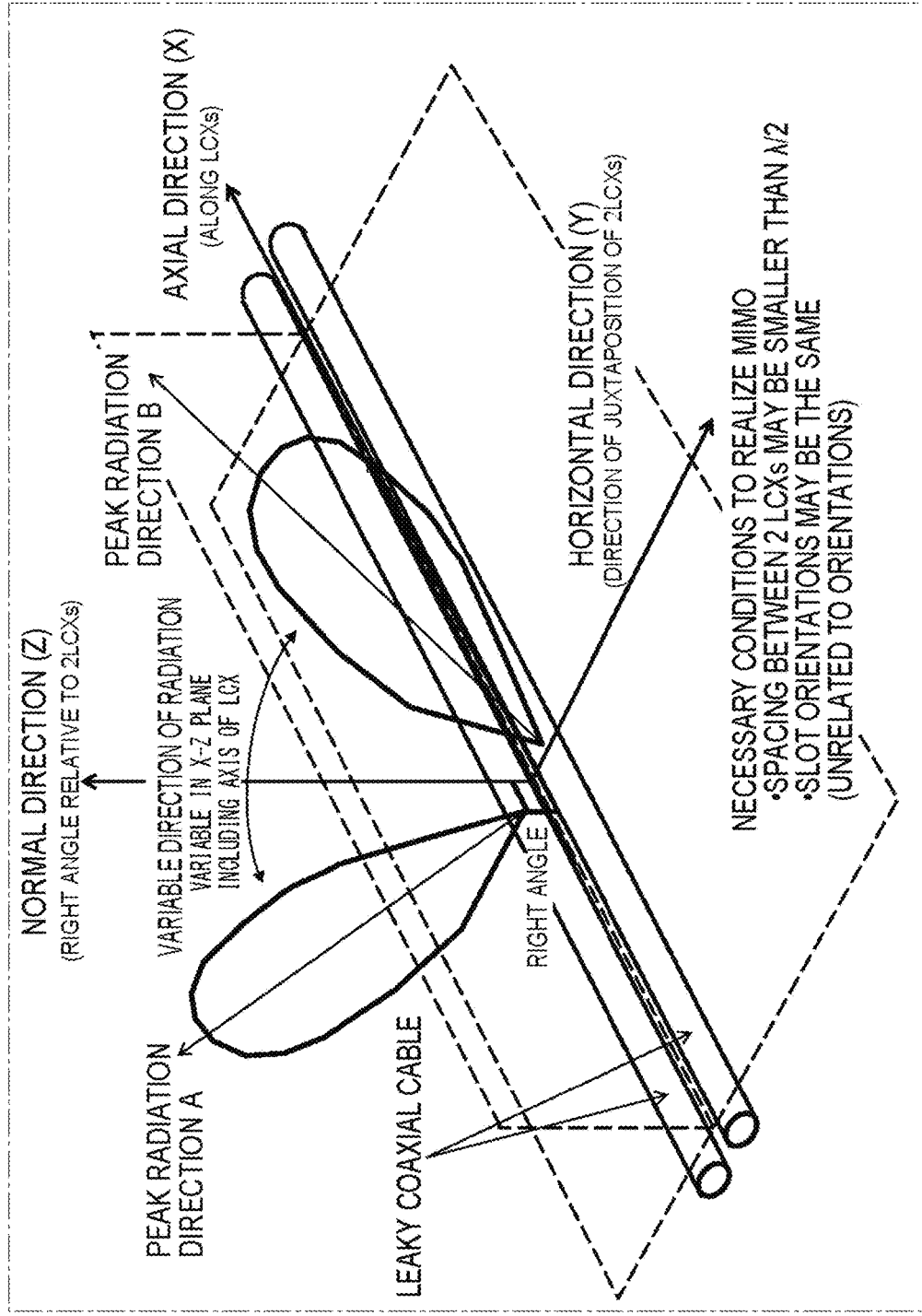
FIG. 30 is an illustration showing peak radiation directions and radiation angles.

This point will be described in detail with reference to FIG. 30. The direction along the LCX is X direction, the direction of arrangement of a plurality of (two in FIG. 30) LCXs is Y direction, and the direction vertical to the X-Y direction is Z direction. The direction of peak radiation means the peak direction in the X-Z plane including the X-axis. The peak direction is not limited to the direction in the X-Z plane including the X-axis, and it may be a direction in the X-Y plane. It is noted, however, that performance may possibly be slightly lower due to the existence of neighboring LCX. Therefore, the peak radiation direction should preferably be the peak direction in the X-Z plane. The peak radiation direction is not limited to the X-Z plane or X-Y plane and it may be in any plane as far as it includes both the X axis and a direction normal to the X axis.

Again referring to FIG. 8, the conditions for radiation here is given by Equation (1) below, where $\phi_{S1}$ is the phase at slot $S_1$, $\phi_{S2}$ is the phase at slot $S_2$, $\phi_A$ is the phase at position A, $\phi_{S1\_S2}$ is the phase between slots $S_1$ and $S_2$, and $\phi_{S1A}$, is the phase from slot $S_1$ to A.

$$\phi_{S2} - \phi_A = (\phi_{S1} - \phi_{S1S2}) - (\phi_{S1} - \phi_{S1A}) \qquad (1)$$

$$= -\phi_{S1S2} + \phi_{S1A}$$

$$= 2n\pi$$

Here, n=0, ±1, ±2, . . . .

When we represent free space wavelength and in-cable wavelength by $\lambda_0$ and $\lambda_g$, respectively, propagation factor $K_0$ in the free space and propagation factor $\beta_g$ in the cable are given by Equations (2) and (3), respectively.

$$k_0 = \frac{2\pi}{\lambda_0} \quad (2)$$

$$\beta_g = \frac{2\pi}{\lambda_g} = \frac{2\pi}{\lambda_0}\sqrt{\varepsilon_r} \quad (3)$$

where $\varepsilon_r$ represents relative permittivity of the insulator.

The electric field components in the $\phi$ direction generating E$\phi$ polarization wave are inverted at neighboring slots as shown in FIG. 8. Therefore, by adding 90 to the phase at slot $S_2$, we obtain Equation (4) as radiation condition equation of E$\phi$ polarization wave.

$$\left(-\frac{2\pi}{\lambda_0}\sqrt{\varepsilon_r}\frac{P}{2}\right) + \frac{2\pi}{\lambda_0}\frac{P}{2}\sin\theta_{\phi,m} = 2n\pi \quad (4)$$

From Equation (4), sin θφ, m (φ, m are in subscript notation, same in the following) can be represented by Equation (5).

$$\sin\theta_{\phi,m} = \frac{(2n+1)}{P}\lambda_0 + \sqrt{\varepsilon_r} \quad (5)$$

Here, to have a radiation wave, θφ, m must be a real number and hence, (2n+1) must be negative. Therefore, the right side of Equation (5) becomes 1 or smaller, and the radiation angle θφ, m is given by Equation (6) below.

$$\theta_{\phi,m} = \sin^{-1}\left(\frac{m}{P}\lambda_0 + \sqrt{\varepsilon_r}\right) \quad (6)$$

where $m = 2n+1 = -1, -3, \ldots$

From the foregoing, it can be understood that the radiation angle can be adjusted by selecting an appropriate material for the insulator or appropriate slot pitch. Specifically, the radiation angle can be adjusted by changing the period at which the slots are formed, changing the permittivity of the insulator or changing the propagation rate in the cable by changing the diameter of core line (internal conductor).

Generally, only a so-called −1st order mode where n is equal to −1 is used. At a frequency causing higher modes of −2nd order mode and higher, electromagnetic waves radiated from a plurality of angles including the −1st order mode interfere with each other, resulting in a standing wave. Therefore, it becomes difficult to realize radiation of electromagnetic wave with uniform intensity.

By way of example, the shorter the slot pitch of zigzag slots, the less the higher mode caused and a single mode of −1st order can be attained. By adjusting the pitch, only the −1st order mode can be attained not only with the zigzag type but also with vertical slots, inclined slots, round slots or rectangular slots.

(Coupling Loss)

The radiation and reception efficiency of LCX can be represented by coupling loss (Lc). The coupling loss is calculated in accordance with Equation (7) from actual measurements, where Pin is an input to the LCX and Pout is an output from an antenna.

$$L_c = -10\log\left(\frac{P_{out}}{P_{in}}\right)[dB] \quad (7)$$

Further, coupling loss Lcr at an arbitrary position r can be calculated in accordance with Equation (8), where the distance $r_0$ from the LCX is the reference.

$$L_{cr} = L_{c0} + 10\log\left(\frac{r}{r_0}\right)[dB] \quad (8)$$

The coupling loss can be adjusted by changing, for example, opening area of the slot. Therefore, it is possible to set cell width corresponding to the shorter axis direction of the linear cell, by a method separate from the power supplied to the LCX.

(Two Types of MIMO Configurations Using LCXs)

(2×2 MIMO with Single LCX)

Figure 9:
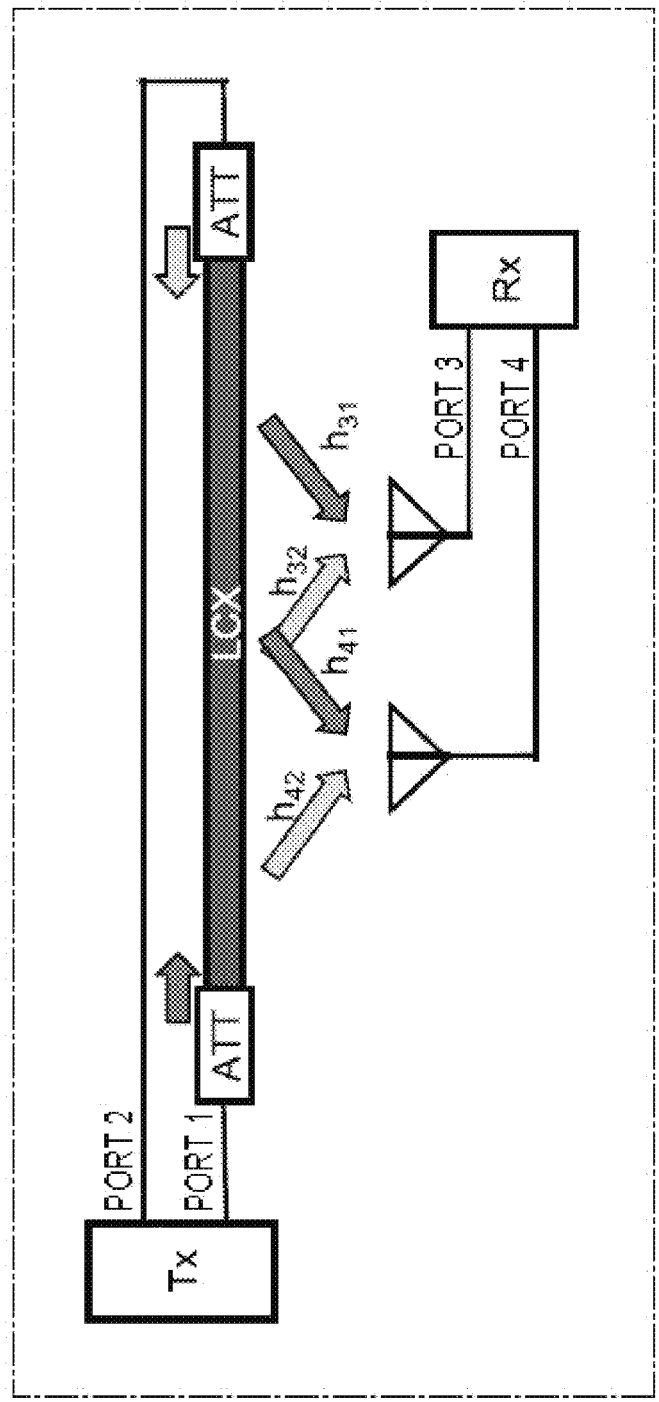
FIG. 9 shows a configuration of an MIMO system using a single LCX as an equivalent of two antennas.

FIG. 9 shows a configuration of an MIMO system using a single LCX as an equivalent of two antennas.

In the configuration shown in FIG. 9, 2×2 MIMO is realized by utilizing the property that the radio wave radiation from LCX has directivity depending on the direction of feeding power to the LCX as described above.

By way of example, when signals are fed to the LCX positioned at the center of FIG. 9 from the left side (port 1) by a transmitter Tx, the signals are radiated in the directions of arrows h31 and h41. Signals from the right side (port 2) are radiated in opposite directions, as indicated by arrows h32 and h42. In addition, because of the phase generated during propagation through the LCX to the radiation slots, different propagation channels result, and received by a receiver Rx.

(2×2 MIMO with Closely-Spaced Two LCXs)

Figure 10:
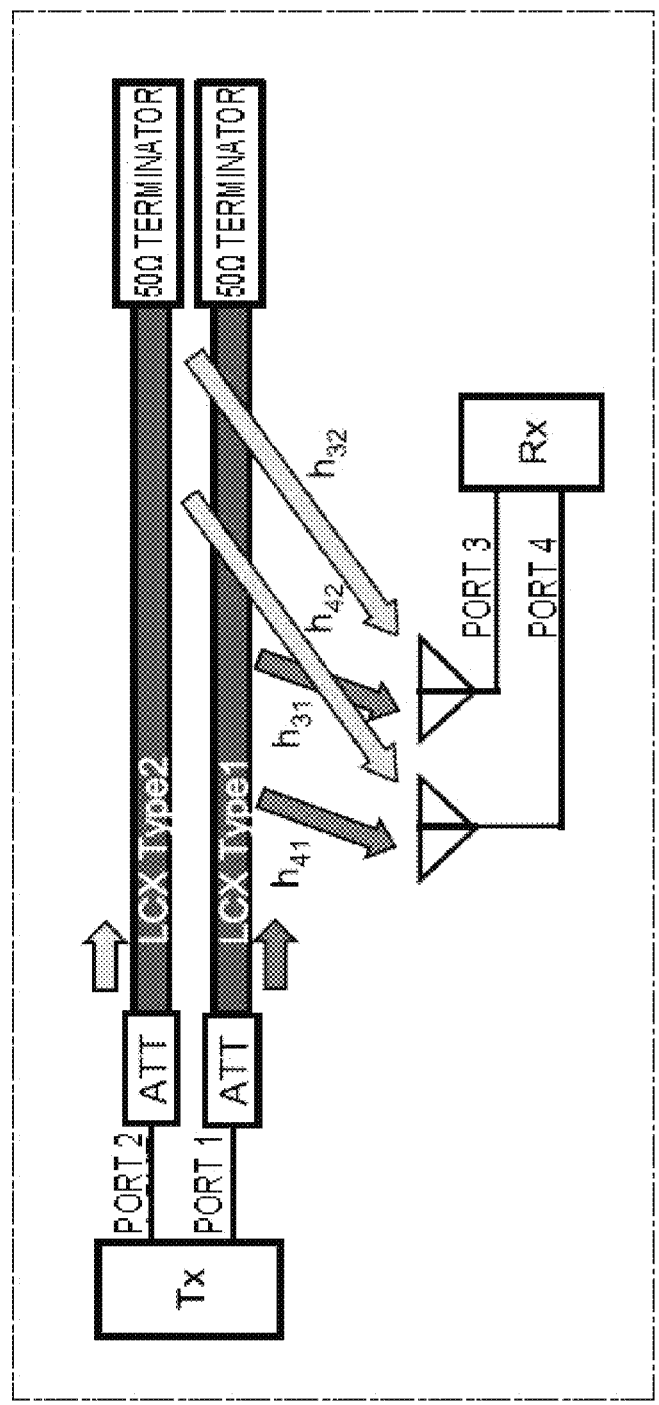
FIG. 10 is an illustration showing a configuration realizing 2×2 MIMO by closely-spaced two LCXs.
Figure 11:
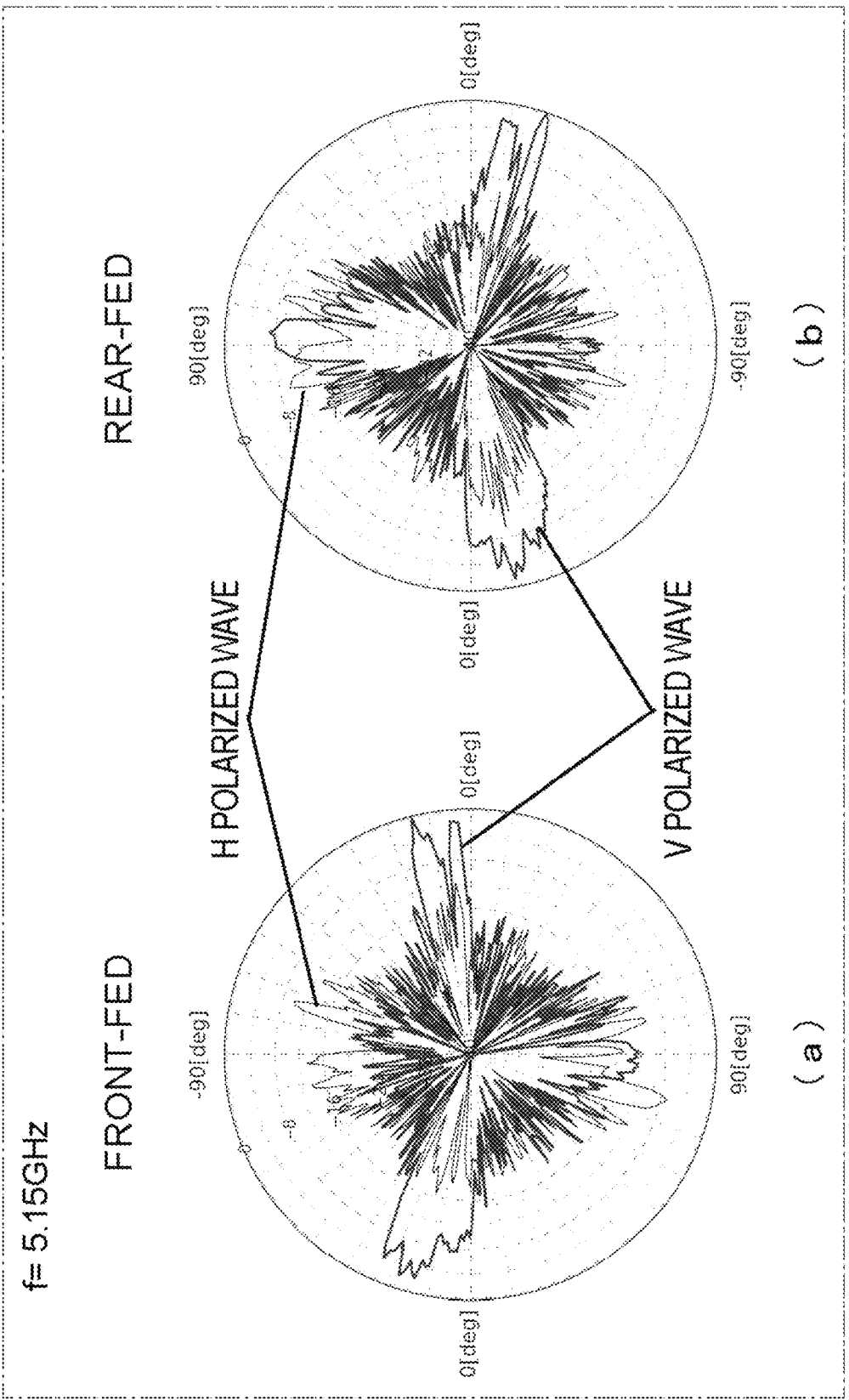
FIG. 11 shows measured radiation patterns of a cable with radiation angle of 11 degrees, when one end of an LCX is terminated with 50Ω.
Figure 12:
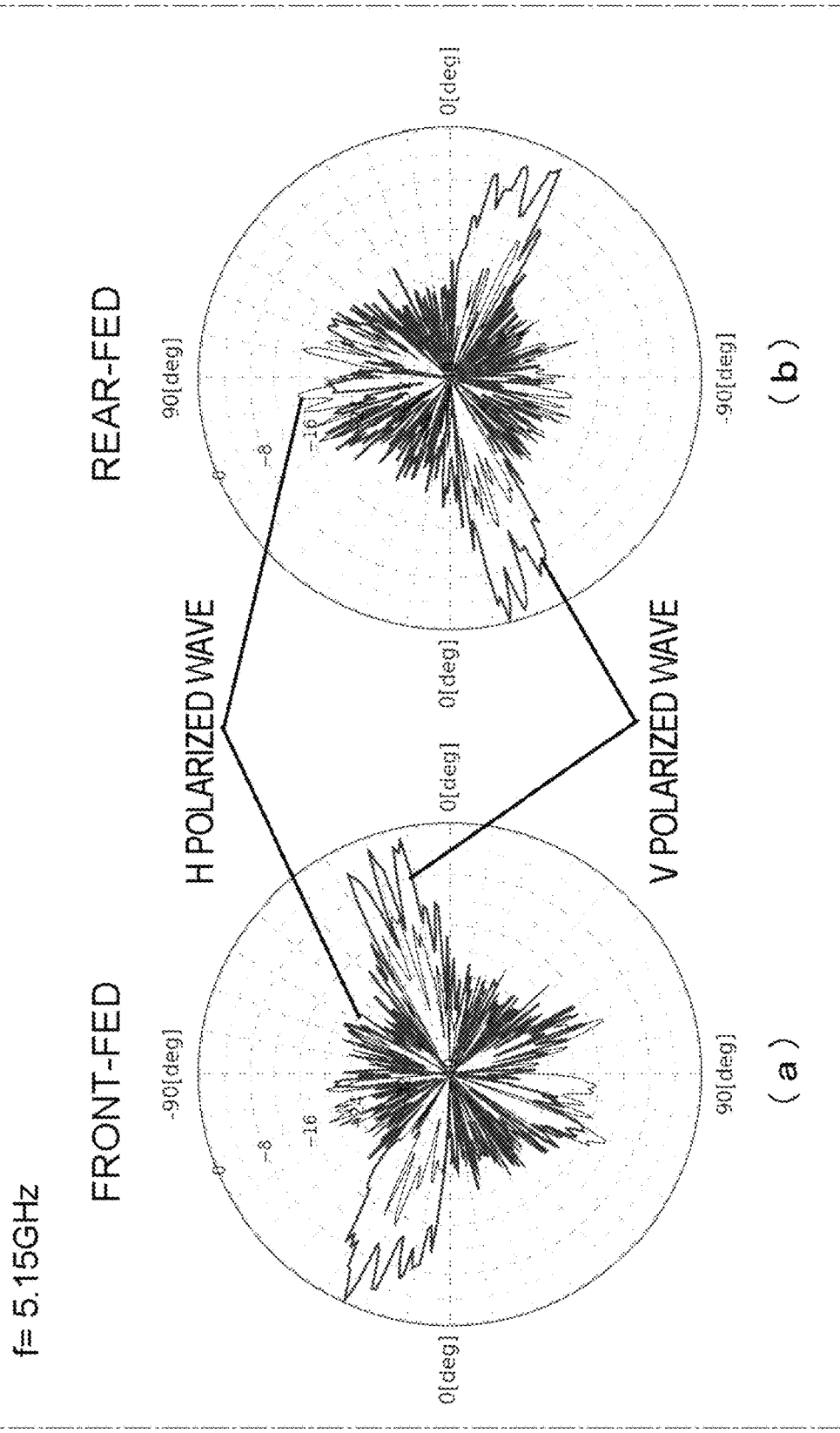
FIG. 12 shows measured radiation patterns of a cable with radiation angle of 18 degrees, when one end of an LCX is terminated with 50Ω.
Figure 13:
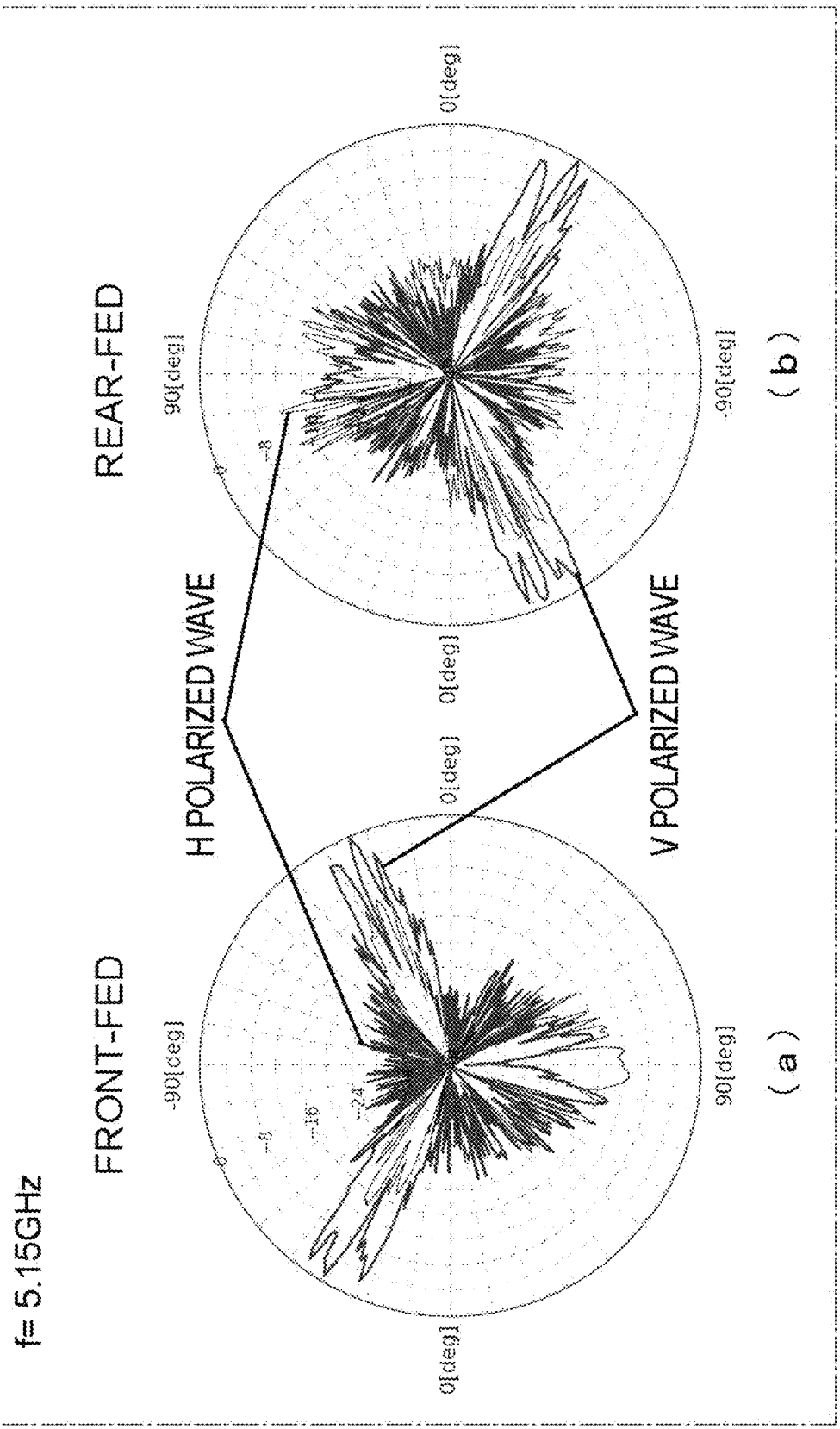
FIG. 13 shows measured radiation patterns of a cable with radiation angle of 26 degrees, when one end of an LCX is terminated with 50Ω.
Figure 14:
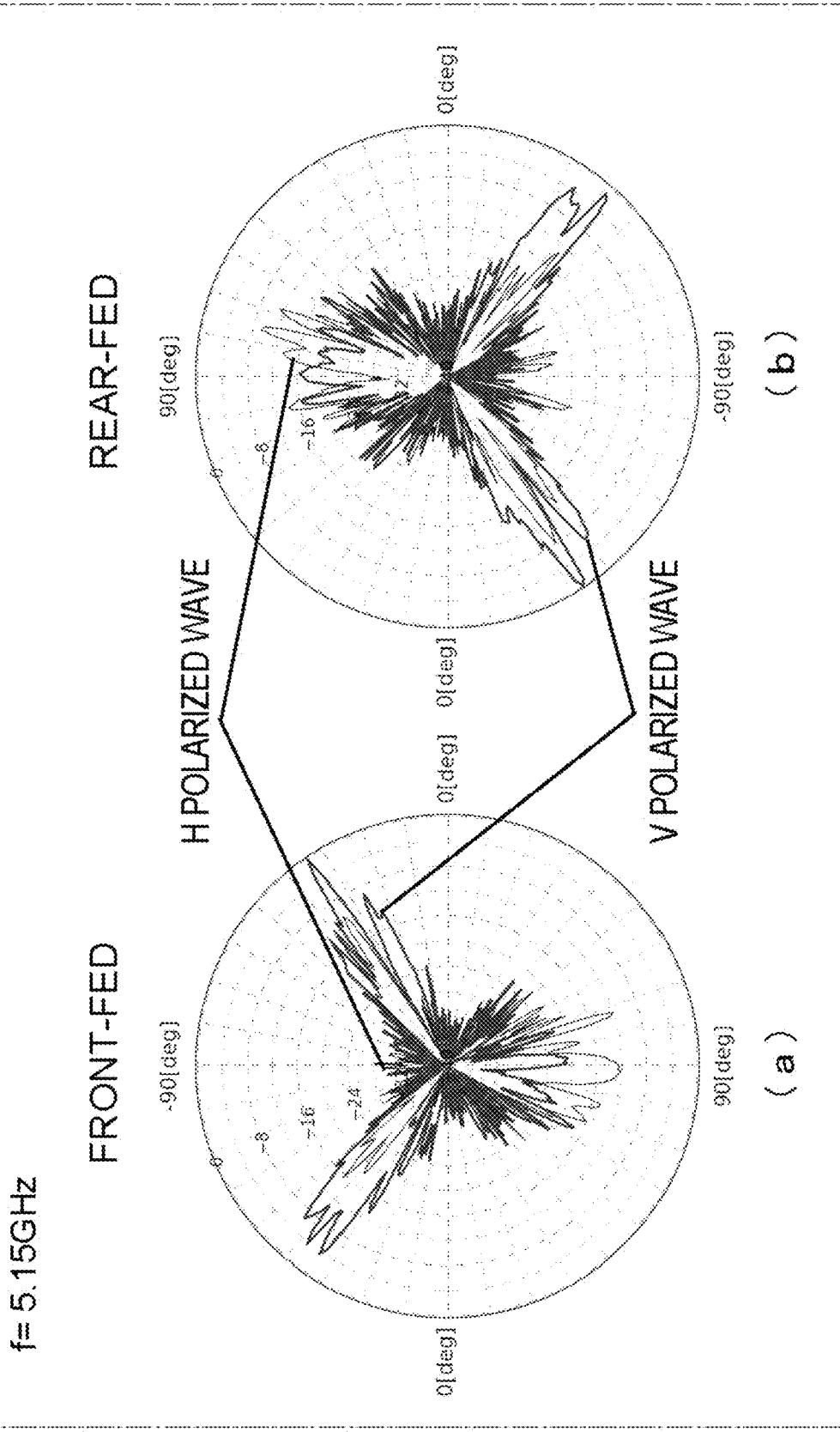
FIG. 14 shows measured radiation patterns of a cable with radiation angle of 35 degrees, when one end of an LCX is terminated with 50Ω.
Figure 15:
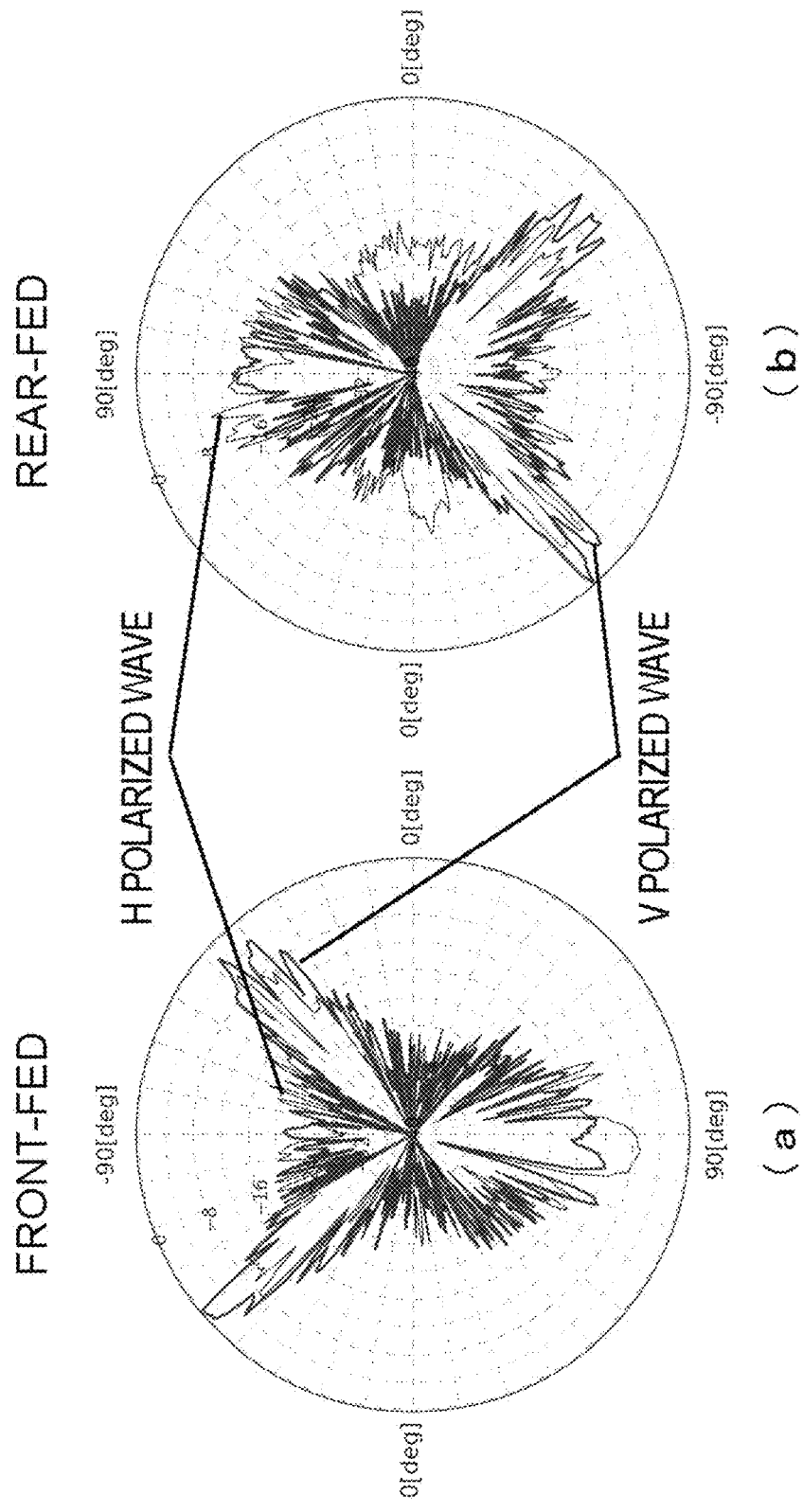
FIG. 15 shows measured radiation patterns of a cable with radiation angle of 44 degrees, when one end of an LCX is terminated with 50Ω.
Figure 16:
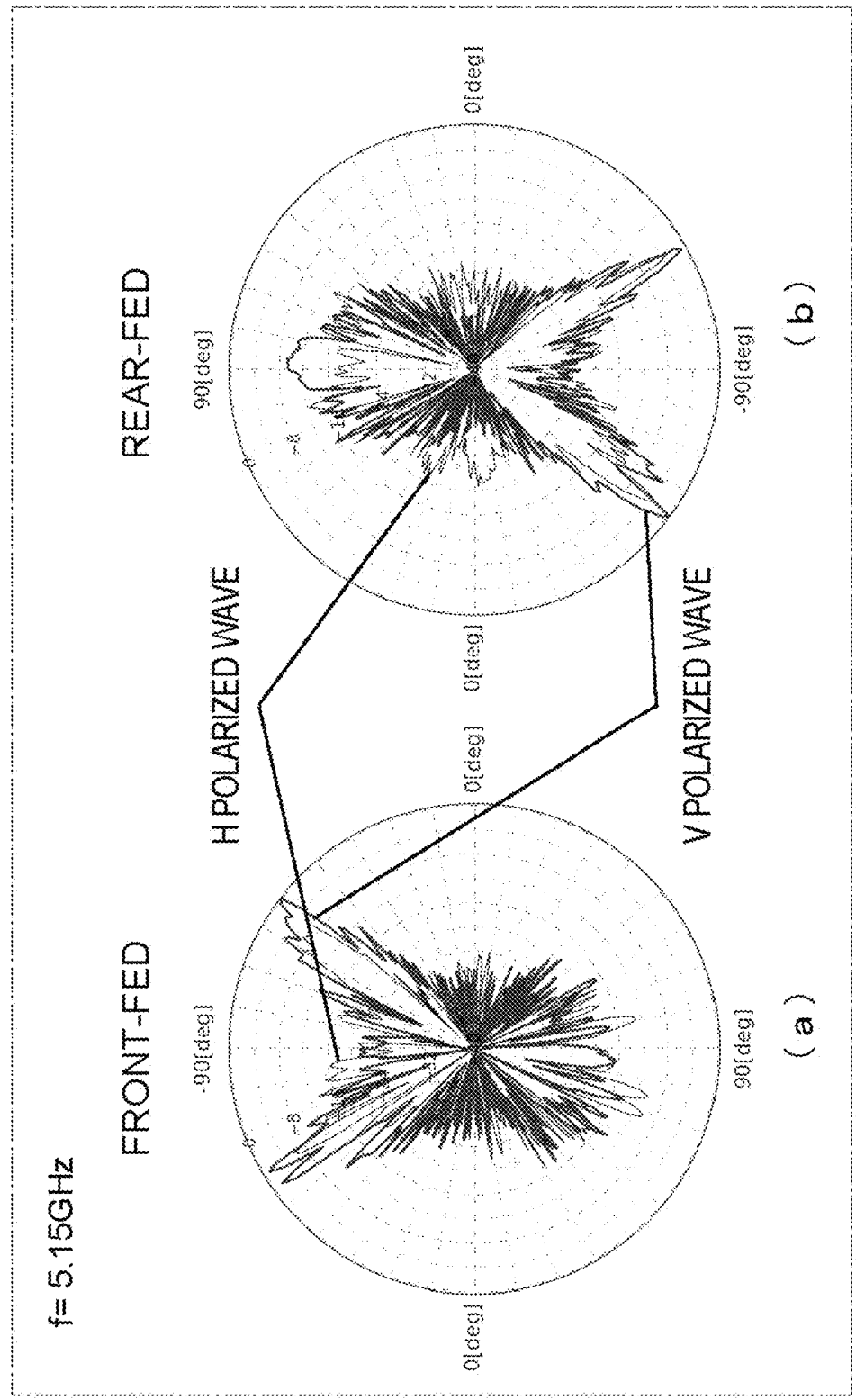
FIG. 16 shows measured radiation patterns of a cable with radiation angle of 55 degrees, when one end of an LCX is terminated with 50Ω.
Figure 17:
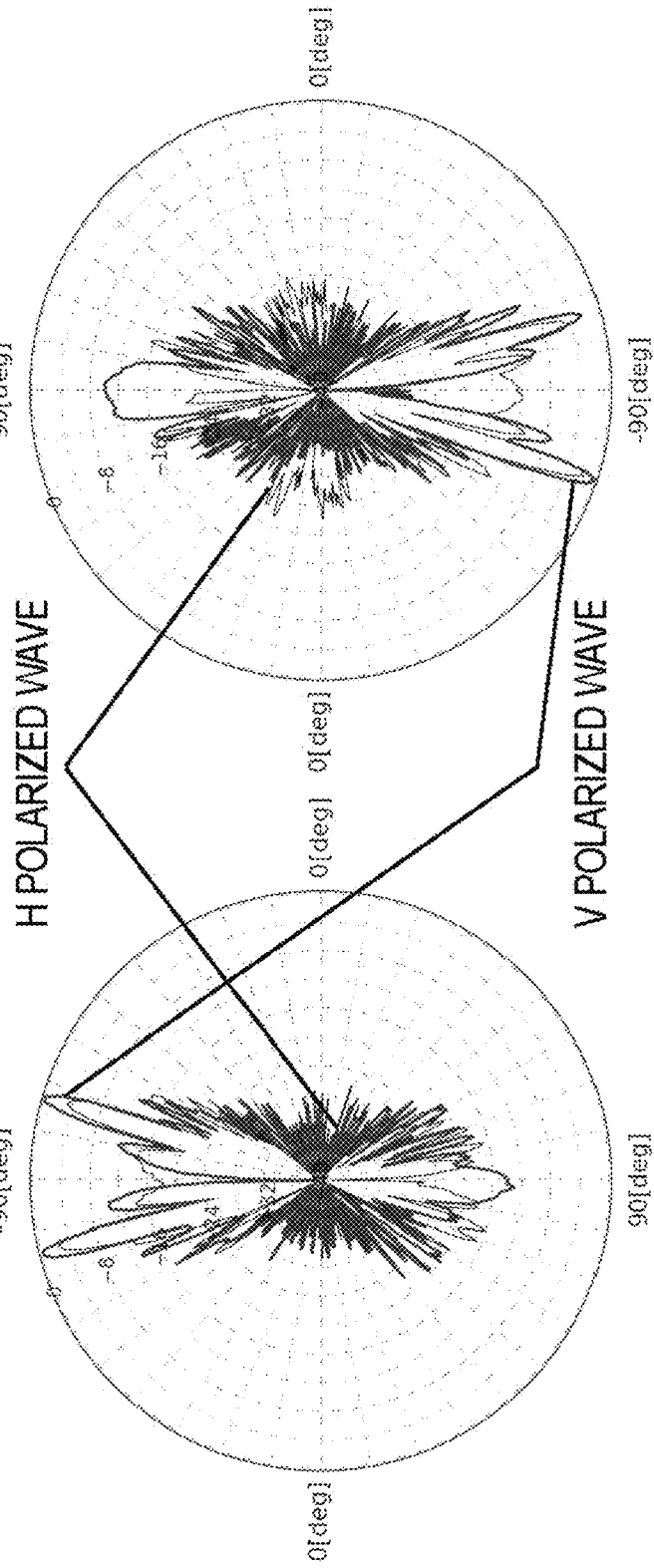
FIG. 17 shows measured radiation patterns of a cable with radiation angle of 71 degrees, when one end of an LCX is terminated with 50Ω.

FIG. 10 is an illustration showing a configuration realizing 2×2 MIMO by closely-spaced two LCXs.

In MIMO with closely-spaced LCXs, LCXs with radiation characteristics made different from each other are combined to realize MIMO with LCXs placed at ½ wavelength or closer. When signals are fed to the LCX positioned at the upper side of FIG. 10 from the left side (port 2) by a transmitter Tx, the signals are radiated in the directions of arrows h32 and h42. The signals on the lower side (port 1) are radiated in different directions, as indicted by arrows h31 and h41. Thus, different propagation channels can be generated and received by receiver Rx. In the example of FIG. 10, the ends opposite to the power feeding side of two LCXs are terminated by terminators.

Similarly, MIMO can be realized by combining LCXs having different polarizations. For this purpose, an LCX having "zigzag type" slots, for example, and an LCX having "vertical type" slots may be combined.

Further, 4×4 MIMO using two closely-spaced LCXs, or 8×8 MIMO using four LCXs can be realized by combining the above-described methods in the following manner.

i) Use two closely-spaced LCXs having the same polarization characteristics and feed power from opposite directions, or use four closely-spaced LCXs having the same polarization characteristics and feed power from opposite directions.

ii) Use two closely-spaced LCXs having different polarization characteristics and feed power from opposite directions, or use four closely-spaced LCXs consisting of two sets of LCXs, with polarization characteristics made different in each set, and feed power from opposite directions.

In addition, since such methods are independent methods directed only to the antenna portion, further improvement in performance is expected by combining these methods with signal processing techniques such as non-linear multi-user MIMO.

(Radiation Patterns of LCX)

In the following, measurement results of LCX radiation patterns will be described.

On a measurement turntable, a radio wave absorber is placed, and an LCX with zigzag-type slots having the length of 3 m was laid horizontally thereon. This was considered as the X-Y plane, and the lengthwise direction of LCX was the X-axis. It is assumed that the radiation pattern was rotationally symmetric about the X-axis, and the vertically and horizontally polarized waves in the X-Y plane were measured. Measurement frequency was 5.15 GHz and the display was normalized with the maximum value being 0 dB.

FIGS. 11 to 17 show measurement results of radiation patterns of cables having radiation angles R (R=11, 18, 26, 35, 44, 55, 71), when one end of LCX was terminated with 50Ω.

FIGS. 11(a) to 17(a) show measurement results of radiation patterns of cables having radiation angles R when one end of LCX was terminated with 50Ω with front-feed. It can be seen from the measurement results that radiation from LCX is the strongest not in the Y-axis direction just beside the LCX but in the direction of about the angle R from the front side when viewed from the feeding direction. Further, as shown in FIGS. 11(b) to 17(b), the same is true when the feeding direction is reversed (rear-feed). Here, the "radiation angle R" means an LCX cable adjusted to have the radiation angle of R degrees in accordance with Equation (6) by adjusting the slot pitch.

From these radiation patterns, it can be seen that direction of radiation changes when feeding end is changed. Therefore, by feeding from both sides, MIMO can be realized even by a single LCX. Further, MIMO can be realized by two closely-spaced LCXs having different radiation angles.

(Measurement Experiment)

Figure 18:
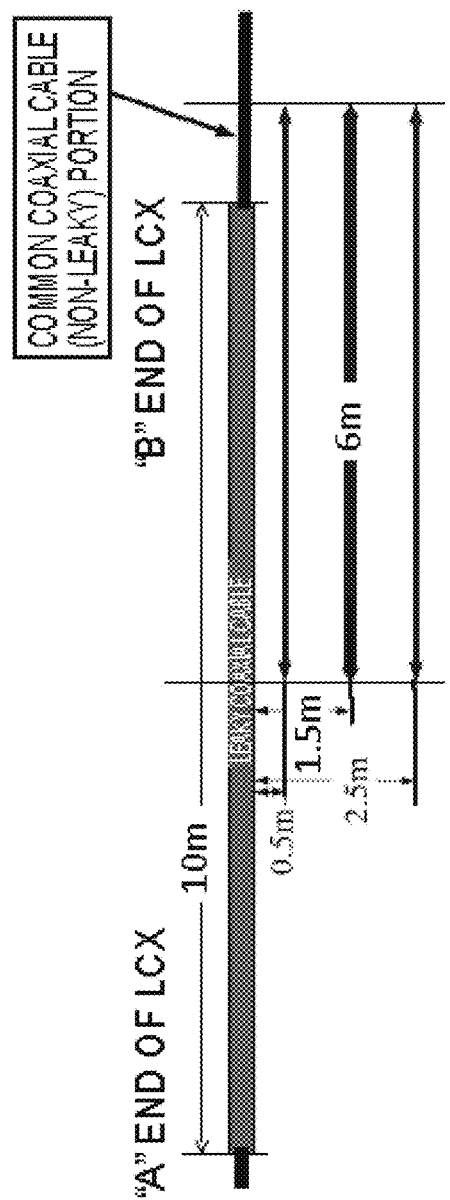
FIG. 18 is an illustration of a configuration for 2×2 MIMO characteristics measurement.

FIG. 18 is an illustration of a configuration for 2×2 MIMO characteristics measurement.

LCX was 10 m, and a common co-axial cable was connected to each end. Using the center of LCX as a start point, a terminal is moved along the X-axis direction on a line parallel to and apart from the LCX by 1.5 m in the Y-axis direction, and throughputs were measured from 0 m to 6 m. Therefore, the last 1 m of 0 m to 6 m range, that is, the section between 5 m to 6 m is outside the end of LCX.

Measurements were done in an anechoic chamber while feeding to ports 1 to 4 of FIG. 9 or FIG. 10. It is considered that an environment where reflection wave from surroundings is usable is advantageous for MIMO. Therefore, we intentionally imposed visibility condition disadvantageous for MIMO, by placing radio wave absorbers at the bottom and rear surfaces to have the direct waves from LCX dominant.

The spacing for terminal antenna elements was ½ wavelength, and on both sides, dummy antennas were placed with the same spacing of ½ wavelength.

Further, as MCS representing combination of modulation, code rate and MIMO multiplicity, conditions from 0 to 4 and conditions from 8 to 12 were appropriately selected by an adaptive rate selecting function.

(2×2 MIMO with Single LCX: Dual Feed)

Figure 19:
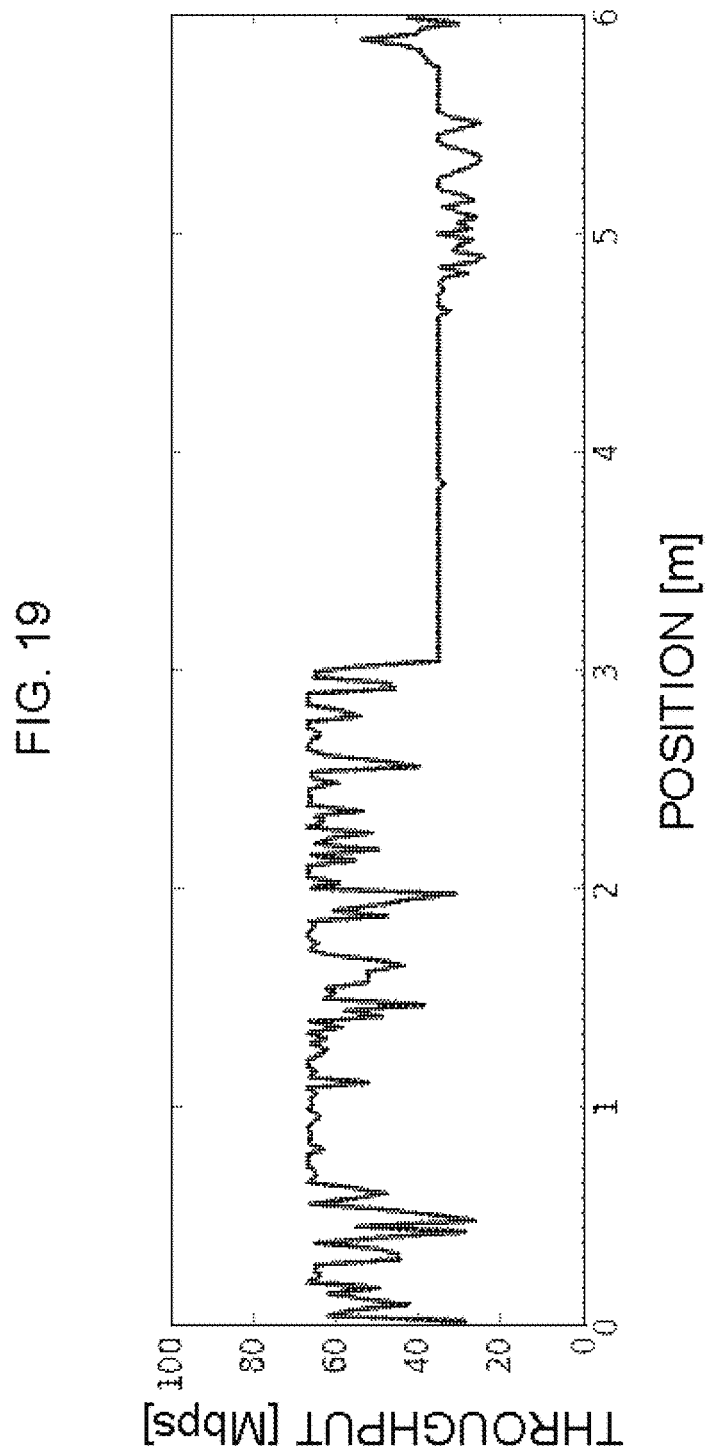
FIG. 19 shows measurement of throughput when an LCX having zigzag slots with radiation angle of 18 degrees was fed from opposite directions.

FIG. 19 shows measurement of throughput when an LCX having zigzag slots with radiation angle of 18 degrees was fed from opposite directions.

Figure 20:
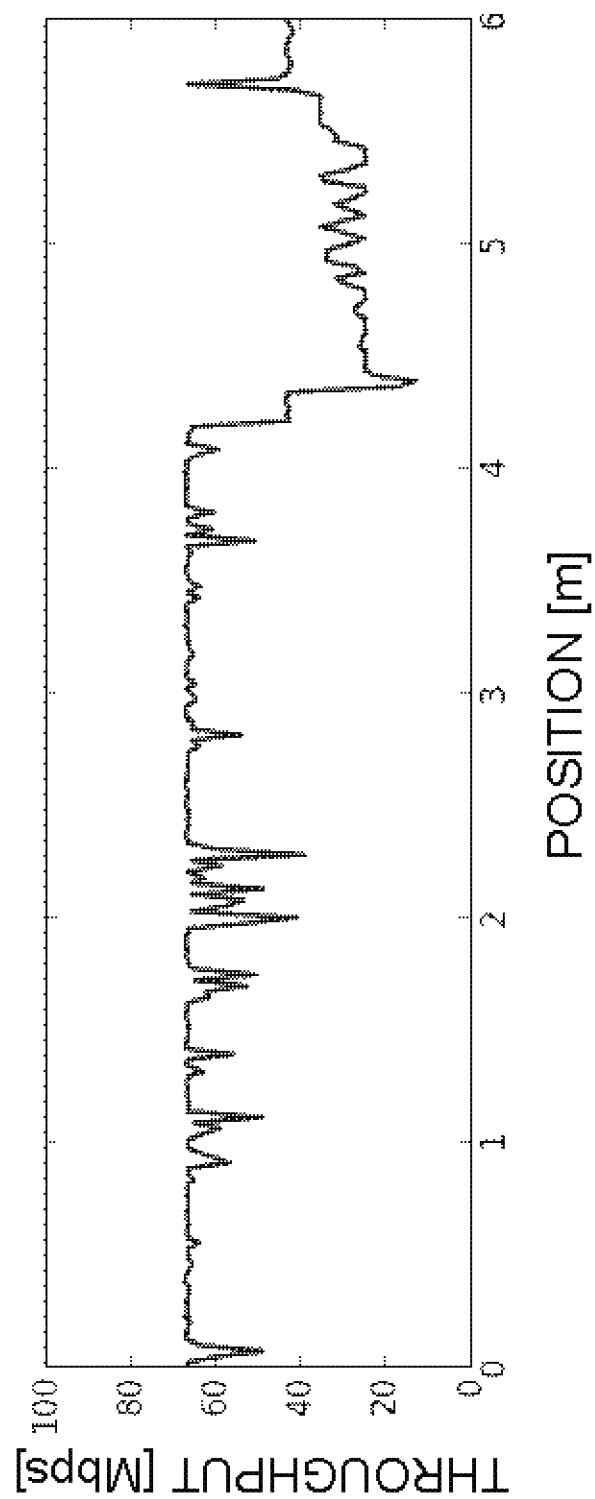
FIG. 20 shows measurement of throughput when an LCX having zigzag slots with radiation angle of 26 degrees was fed from opposite directions.

FIG. 20 shows measurement of throughput when an LCX having zigzag slots with radiation angle of 26 degrees was fed from opposite directions.

Figure 21:
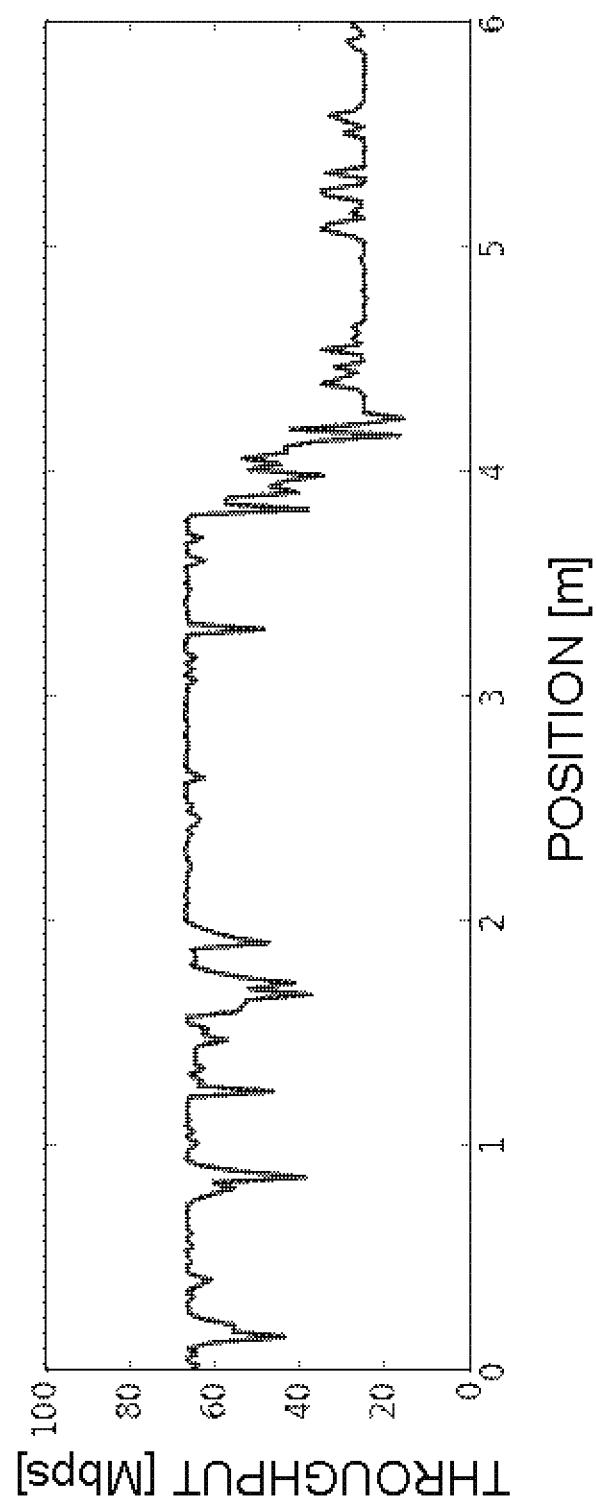
FIG. 21 shows measurement of throughput when an LCX having zigzag slots with radiation angle of 35 degrees was fed from opposite directions.

FIG. 21 shows measurement of throughput when an LCX having zigzag slots with radiation angle of 35 degrees was fed from opposite directions.

Figure 22:
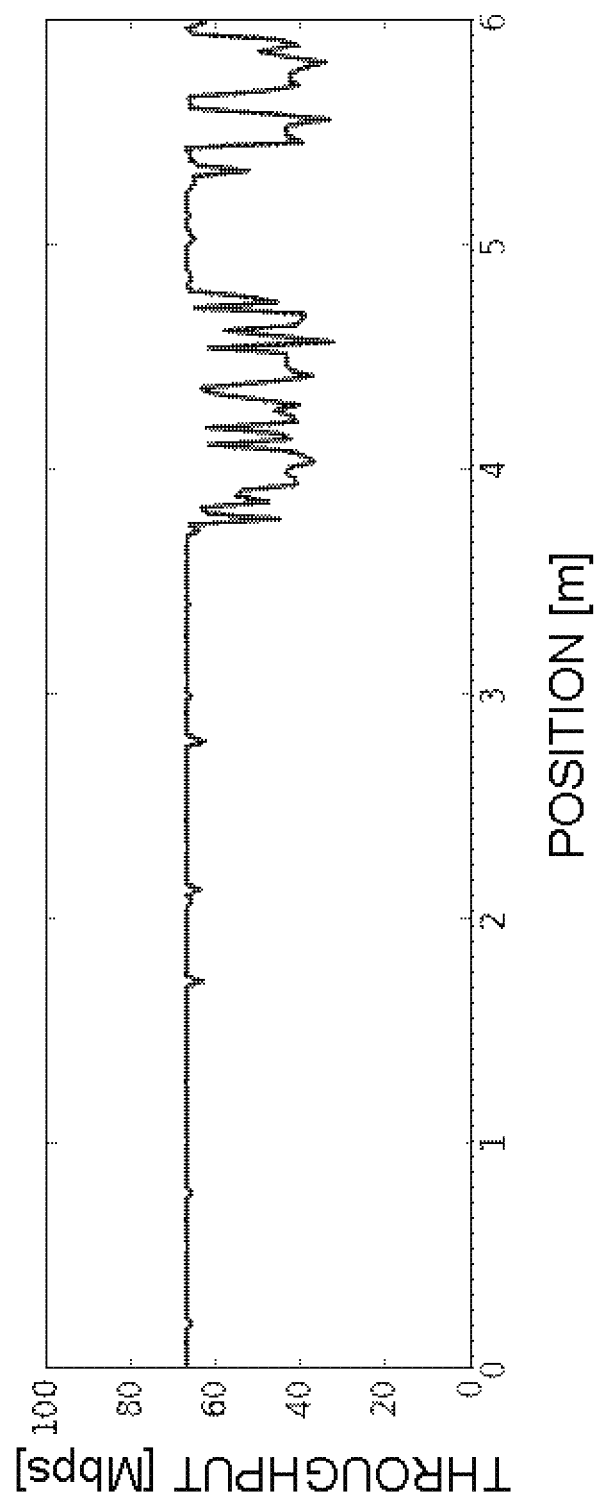
FIG. 22 shows measurement of throughput when an LCX having zigzag slots with radiation angle of 44 degrees was fed from opposite directions.

FIG. 22 shows measurement of throughput when an LCX having zigzag slots with radiation angle of 44 degrees was fed from opposite directions.

Figure 23:
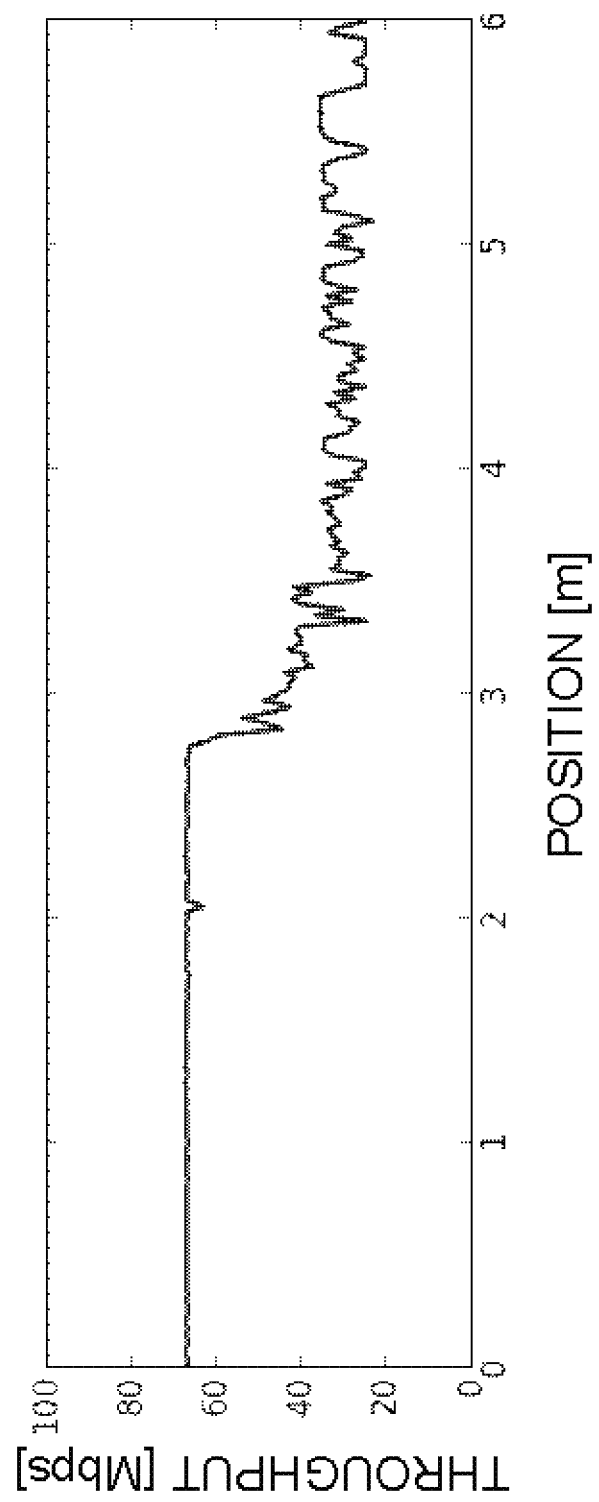
FIG. 23 shows measurement of throughput when an LCX having zigzag slots with radiation angle of 55 degrees was fed from opposite directions.

FIG. 23 shows measurement of throughput when an LCX having zigzag slots with radiation angle of 55 degrees was fed from opposite directions.

In any of FIGS. 19 to 23, it can be seen that near the center of LCX, the throughput is higher than in the case of single stream, reflecting the fact that 2×2 MIMO communication is realized.

It is noted, however, that near the end portions of LCX, the throughput decreases, and the area where the decrease occurs depends on the radiation angle.

Considering the radiation characteristics of LCX, the possible range of MIMO communication or the boundary of cell would substantially correspond to a line drawn from the end of LCX (X=5 m, Y=0 m) in the direction of the radiation angle. Therefore, areas farther from the center of LCX have lower throughputs. The throughput is relatively stable at locations closer to the center of LCX from this line.

(2×2 MIMO with Single LCX: Single Feed)

In the following will be described the measurement results of throughputs when two closely-spaced LCXs having different radiation angles were fed from one side. The arrangement for measuring the characteristics of 2×2 MIMO was the same as that shown in FIG. 18.

Figure 24:
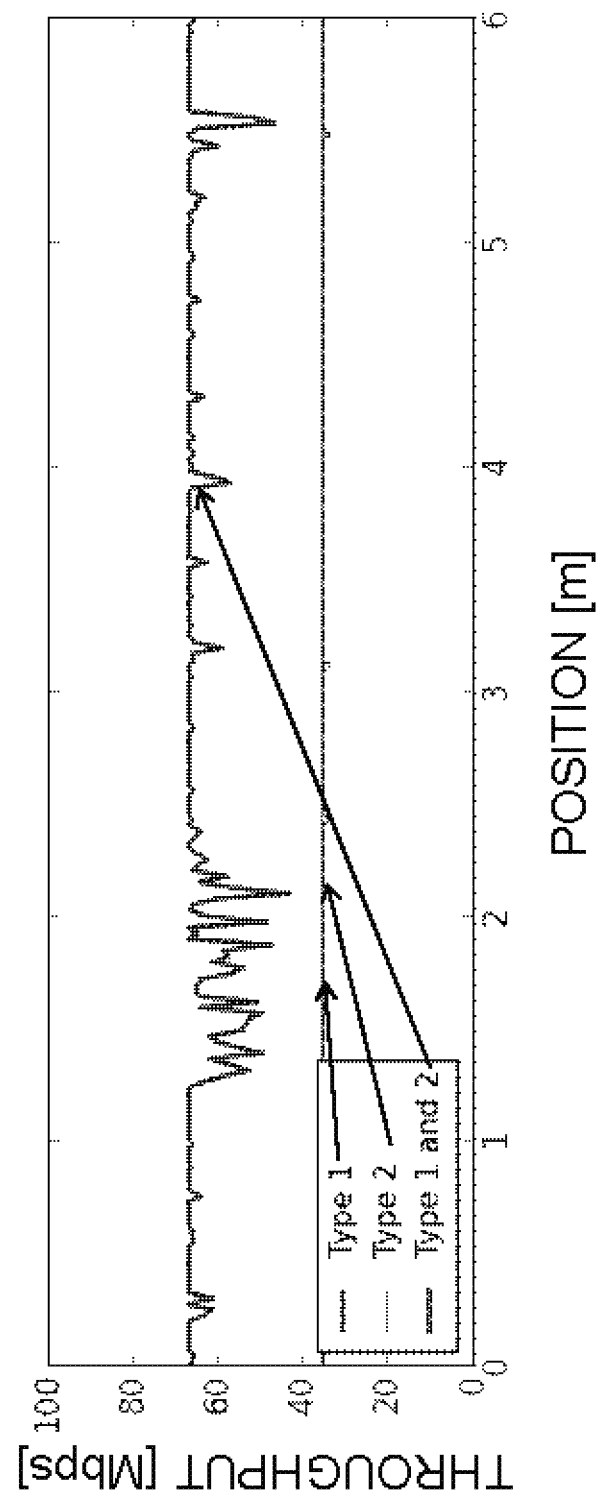
FIG. 24 shows measurement of throughput when closely-positioned two LCXs of radiation angles of 18 degrees and 55 degrees were fed from one direction.

FIG. 24 shows measurement of throughput when closely positioned two LCXs of radiation angles of 18 degrees and 55 degrees were fed from one direction.

Figure 25:
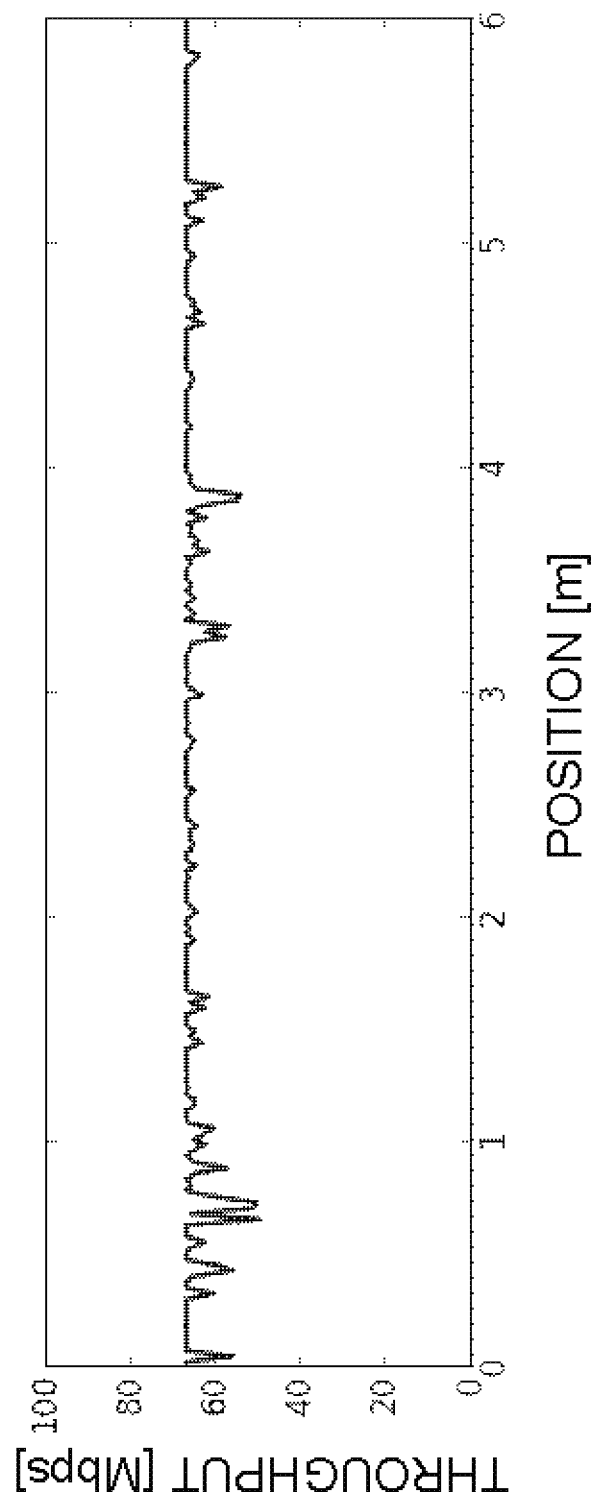
FIG. 25 shows measurement of throughput when closely-positioned two LCXs of radiation angles of 26 degrees and 55 degrees were fed from one direction.

FIG. 25 shows measurement of throughput when closely positioned two LCXs of radiation angles of 26 degrees and 55 degrees were fed from one direction.

Figure 26:
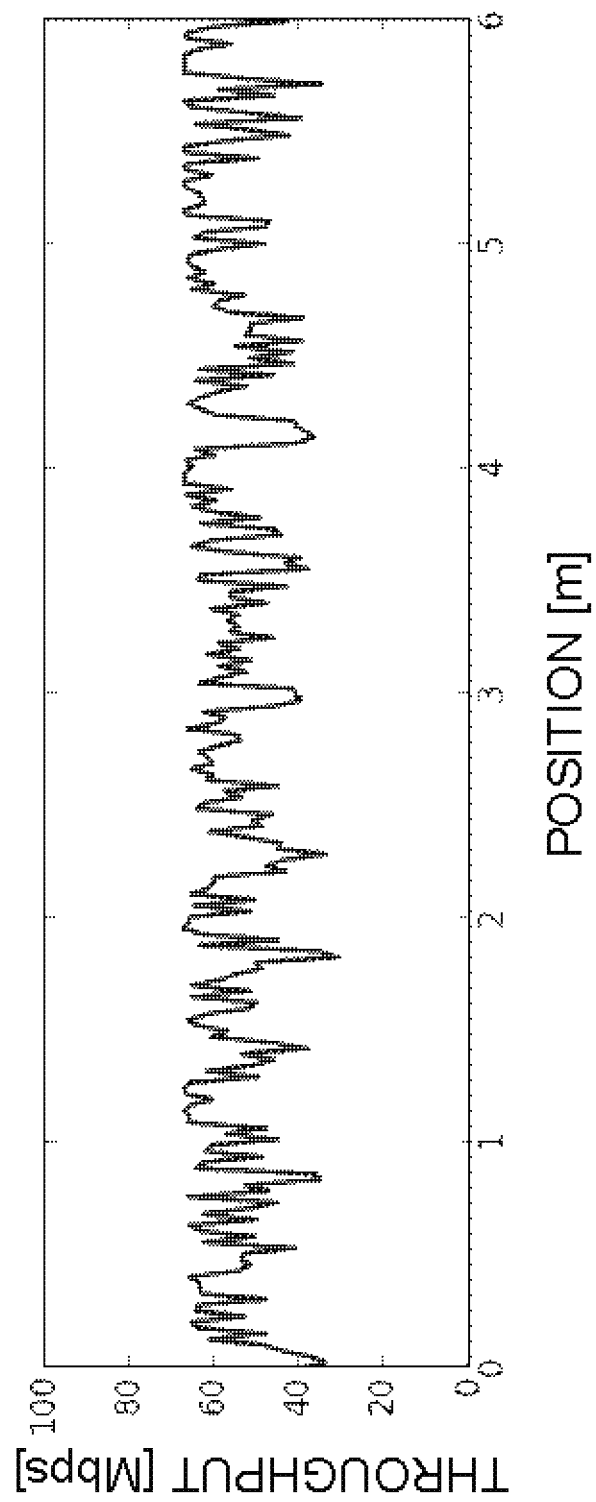
FIG. 26 shows measurement of throughput when closely-positioned two LCXs of radiation angles of 44 degrees and 55 degrees were fed from one direction.

FIG. 26 shows measurement of throughput when closely positioned two LCXs of radiation angles of 44 degrees and 55 degrees were fed from one direction.

Figure 27:
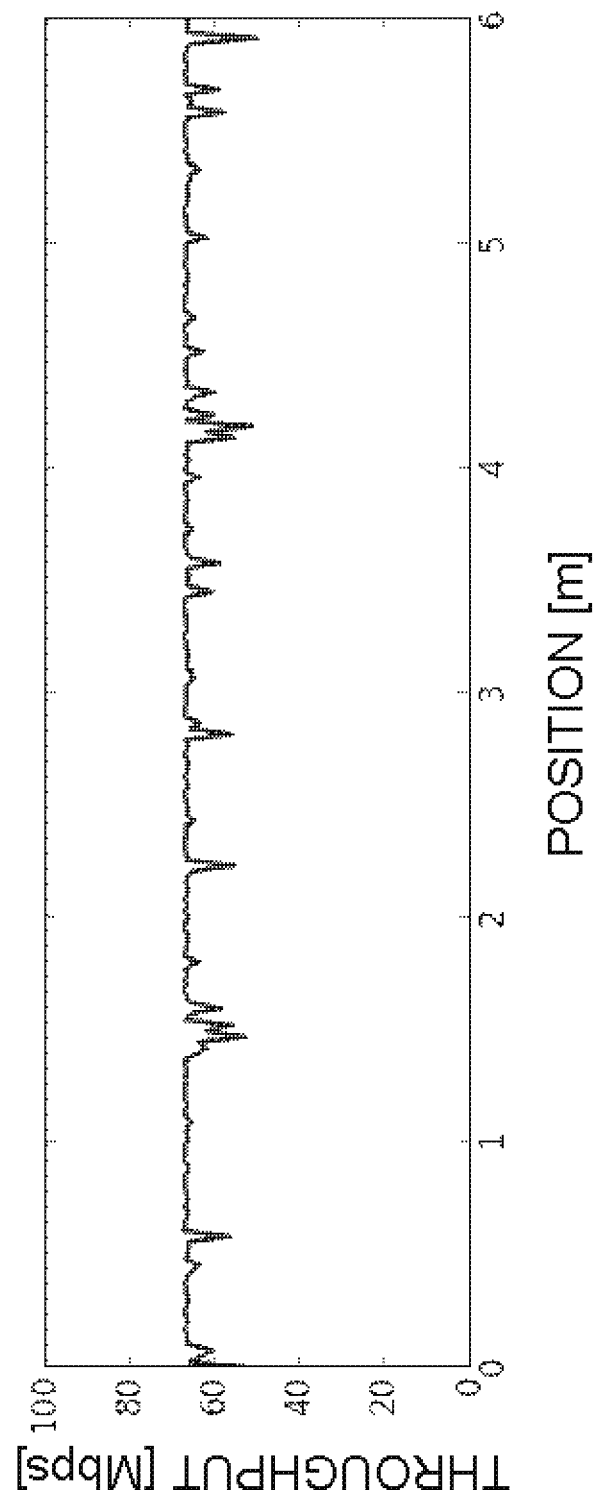
FIG. 27 shows measurement of throughput when closely-positioned two LCXs of radiation angles of 26 degrees and 71 degrees were fed from one direction.

FIG. 27 shows measurement of throughput when closely positioned two LCXs of radiation angles of 26 degrees and 71 degrees were fed from one direction.

Figure 28:
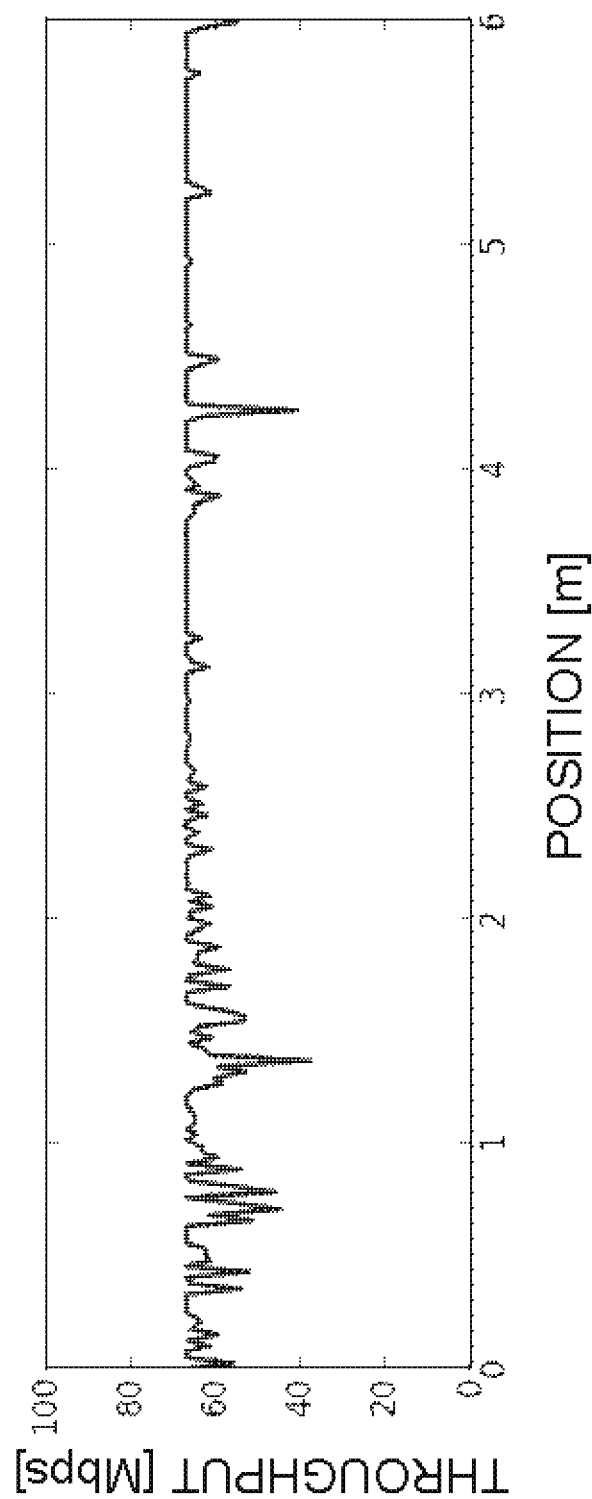
FIG. 28 shows measurement of throughput when closely-positioned two LCXs of radiation angles of 35 degrees and 55 degrees were fed from one direction.

FIG. 28 shows measurement of throughput when closely positioned two LCXs of radiation angles of 35 degrees and 55 degrees were fed from one direction.

Figure 29:
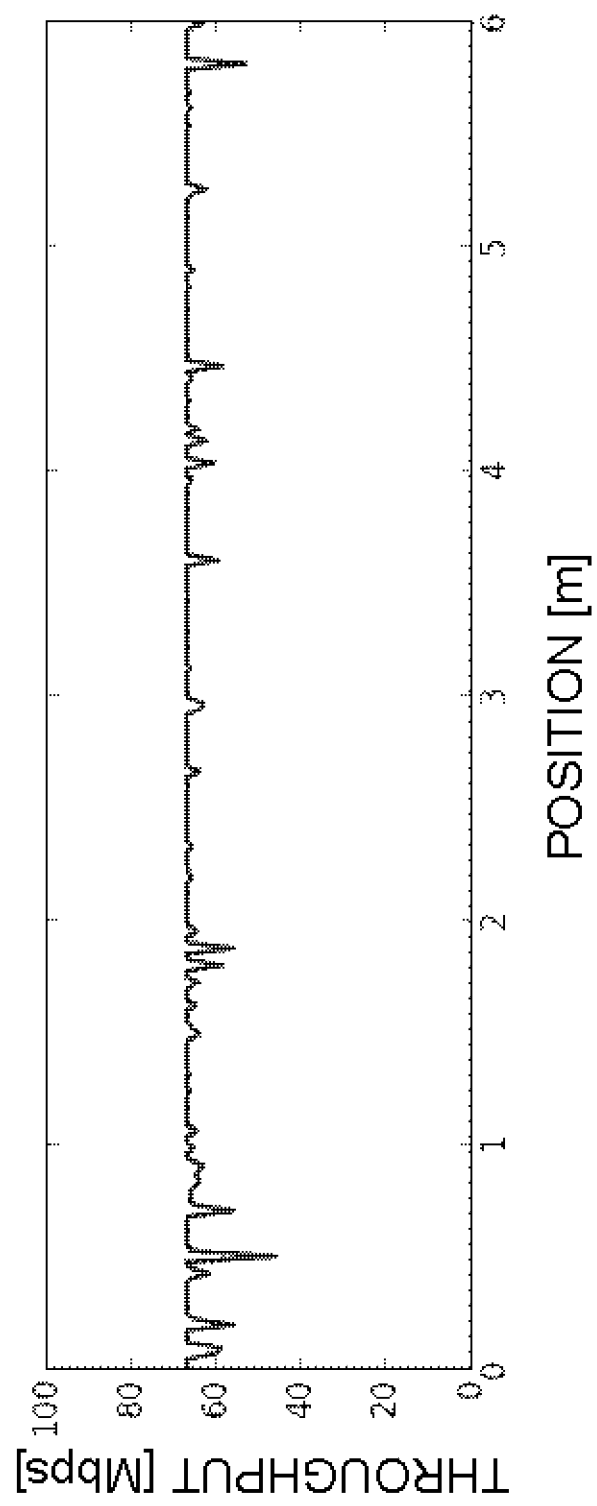
FIG. 29 shows measurement of throughput when closely-positioned two LCXs of radiation angles of 35 degrees and 71 degrees were fed from one direction.

FIG. 29 shows measurement of throughput when closely positioned two LCXs of radiation angles of 35 degrees and 71 degrees were fed from one direction.

First, referring to FIG. 24, "Type 1" represents an example in which only an LCX having the radiation angle of 18 degrees was fed from one direction, and "Type 2" represents an example in which only an LCX having the radiation angle of 55 degrees was fed from one direction. "Type 1 and Type 2" represents an example in which two LCXs having radiation angles of 18 degrees and 55 degrees were both fed from one side.

By feeding simultaneously to two LCXs, the throughput could be approximately doubled and, hence, it is recognized that 2×2 MIMO was realized.

The following figures FIG. 25 to FIG. 28 show examples when two LCXs were both fed from one direction.

It can be seen that MIMO communication was realized by the combination of two LCXs having the radiation angles of 44 degrees and 55 degrees shown in FIG. 26, which is an example in which the difference in radiation angles between the two leaky coaxial cables is the smallest. It is noted, however, that combinations other than the combination of two LCXs having the radiation angles of 44 and 55 degrees realized more stable 2×2 MIMO in the areas of a prescribed range. Further, it can be seen that 2×2 MIMO was realized in wide areas beyond the ends of LCXs.

From the foregoing, it can be seen that when two closely-placed LCXs having different radiation angles are fed from one side, at least, in order to perform MIMO communication, the difference in radiation angles of 11 degrees or larger is preferable, the difference in radiation angles of 15 degrees or larger is more preferable, and if the difference in radiation angles is 20 degrees or larger, optimal MIMO communication can be realized.

Similar to the first embodiment, MIMO communication can be realized by a plurality of closely-spaced LCXs and, hence, the plurality of LCXs may be collectively housed in one covering structure.

Further, it is possible to feed from opposite sides of the structure housing the plurality of LCXs collectively in one covering structure.

As described above, by the digital wireless communication device and digital wireless communication system in accordance with the present embodiment, MIMO communication is realized by using leaky coaxial cables having different radiation characteristics for a linear cell formed by the leaky coaxial cables and, therefore, it becomes possible to accommodate heavier communication traffic.

Further, by the digital wireless communication device and digital wireless communication system in accordance with the present embodiment, a plurality of LCXs can be housed in one covering structure; therefore, it becomes possible to accommodate heavier communication traffic without increasing the cost of installing the leaky coaxial cables.

The embodiments as have been described here are mere examples for implementing the present invention, and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

According to the present invention, a linear cell is formed by using leaky coaxial cables, and digital wireless communication device and digital wireless communication system capable of accommodating heavier communication traffic can be provided. Further, according to the present invention, digital wireless communication device and digital wireless communication system enabling heavier communication traffic without increasing the cost of installing the leaky coaxial cables can be provided.

REFERENCE SIGNS LIST

10.1~10.$n$ node
20 signal transmission unit
30 digital signal processing unit
302 D/A converter unit
308 transmission signal weight control unit
310 modulating unit
312 encoding unit
1000 digital wireless communication device

The invention claimed is:

1. A digital wireless communication device for executing multiple-input multiple-output (MIMO) communications, comprising:
a composite cable housing, in a single covering structure, a plurality of leaky coaxial cables having radiation characteristics different from each other; and
a transmitter for feeding a high-frequency signal from at least one end of said composite cable to execute MIMO communications, wherein
each of said leaky coaxial cables includes an inner conductor, an outer conductor, an insulator between said inner conductor and outer conductor, and a plurality of leakage slots arranged along the outer conductor,
said plurality of leaky coaxial cables have radiation angles different from each other, the radiation angle being an angle between peak radiation direction and normal direction of the axial direction of said leaky coaxial cable in a plane including the axial direction and the normal direction, and
said electric permittivity of the insulator between said inner conductor and outer conductor, or a diameter of said inner conductor, of each of the plurality of leaky coaxial cables is different from other leaky coaxial cables so as to have said different radiation angles.

2. The digital wireless communication device according to claim 1, wherein said plurality of leaky coaxial cables have said leakage slots arranged at periods different cable by cable so as to have said different radiation angles.

3. The digital wireless communication device according to claim 1, wherein difference of said different radiation angles is at least 11 degrees.

4. The digital wireless communication device according to claim 1, wherein among said plurality of leaky coaxial cables, angles of said leakage slots relative to the axial direction of the leaky coaxial cables are different cable by cable.

5. The digital wireless communication device according to claim 1, wherein said transmitting means feeds a high-frequency signal to each of said leaky coaxial cables from opposite ends of said composite cable.

6. The digital wireless communication device according to claim 2, wherein difference of said different radiation angles is at least 11 degrees.

7. The digital wireless communication device according to claim 2, wherein said transmitting means feeds a high-frequency signal to each of said leaky coaxial cables from opposite ends of said composite cable.

8. The digital wireless communication device according to claim 3, wherein said transmitting means feeds a high-frequency signal to each of said leaky coaxial cables from opposite ends of said composite cable.

9. The digital wireless communication device according to claim 2, wherein said plurality of leaky coaxial cables are housed in a single covering structure.

10. A digital wireless communication system for executing multiple-input multiple-output (MIMO) communications, comprising:
a fixedly-installed first digital wireless communication device, said first digital wireless communication device including
a composite cable housing, in a single covering structure, a plurality of leaky coaxial cables having radiation characteristics different from each other; and
a transmitter for feeding a high-frequency signal from at least one end of said composite cable to execute MIMO communications, wherein
each of said leaky coaxial cables includes an inner conductor, an outer conductor, an insulator between said inner conductor and outer conductor, and a plurality of leakage slots arranged along the outer conductor, said plurality of leaky coaxial cables have radiation angles different from each other, the radiation angle being an angle between peak radiation direction and normal direction of the axial direction of said leaky coaxial cable in a plane including the axial direction and the normal direction, and said electric permittivity of the insulator between said inner conductor and outer conductor, or a diameter of said inner conductor, of each of the plurality of leaky coaxial cables is different from other leaky coaxial cables so as to have said different radiation angles;

said system further comprising:

a mobile terminal as a second digital wireless communication device performing said MIMO communication with said first digital wireless communication device.

11. The digital wireless communication system according to claim 10, wherein said plurality of leaky coaxial cables have said leakage slots arranged at periods different cable by cable so as to have said different radiation angles.

12. The digital wireless communication system according to claim 10, wherein difference of said different radiation angles is at least 11 degrees.

13. The digital wireless communication system according to claim 10, wherein among said plurality of leaky coaxial cables, angles of said leakage slots relative to the axial direction of the leaky coaxial cables are different cable by cable.

14. The digital wireless communication system according to claim 10, wherein said transmitting means feeds a high-frequency signal to each of said leaky coaxial cables from opposite ends of said composite cable.

* * * * *